United States Patent
Yamazaki

(10) Patent No.: US 7,386,081 B2
(45) Date of Patent: Jun. 10, 2008

(54) TIMING CONTROL CIRCUIT AND METHOD THEREOF

(75) Inventor: Kiyohiko Yamazaki, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 446 days.

(21) Appl. No.: 10/278,790

(22) Filed: Oct. 24, 2002

(65) Prior Publication Data

US 2003/0081711 A1    May 1, 2003

(30) Foreign Application Priority Data

Oct. 29, 2001  (JP)  ............................ 2001-330141
Jan. 17, 2002  (JP)  ............................ 2002-008778

(51) Int. Cl.
*H04L 7/00*    (2006.01)

(52) U.S. Cl. ...................... 375/368; 375/354; 375/355; 370/514; 370/509; 370/324; 370/513; 370/510

(58) Field of Classification Search ................ 375/368, 375/116, 354, 355; 370/100, 514, 509, 324, 370/513, 510

See application file for complete search history.

(56) References Cited

U.S. PATENT DOCUMENTS

| 3,641,274 | A | * | 2/1972 | Sasaki et al. ............... 370/324 |
| 4,347,606 | A | * | 8/1982 | Hoogeveen ................. 370/510 |
| 4,598,413 | A | * | 7/1986 | Szechenyi ................... 375/368 |
| 4,748,623 | A | * | 5/1988 | Fujimoto .................... 370/513 |
| 4,920,546 | A | * | 4/1990 | Iguchi et al. ............... 375/354 |
| 6,317,441 | B1 | * | 11/2001 | Nakajima ................... 370/509 |
| 6,959,059 | B1 | * | 10/2005 | Yamazaki ................... 375/368 |

* cited by examiner

*Primary Examiner*—Chieh M. Fan
*Assistant Examiner*—Eva Puente
(74) *Attorney, Agent, or Firm*—Volentine & Whitt, P.L.L.C.

(57) ABSTRACT

A timing control circuit includes a synchronous detecting portion which detects a synchronous pattern data of a received signal which has been demodulated based on a first control signal and generates a detection result, a first counter portion which generates a first signal at each first cycle based on the detection result, a second counter portion which generates a second signal at each second cycle based on the detection result, and a first control portion which generates the first control signal based on the first and second signals.

5 Claims, 14 Drawing Sheets

TIMING CONTROL CIRCUIT AND METHOD THEREOF

BACKGROUND OF THE INVENTION

1. Field of the Invention

The present invention generally relates to wireless communication techniques and, more particularly, to a timing control circuit and method for timing control in Time Division Multiple Access (TDMA) communication systems.

This is a counterpart of and claims priority to Japanese patent application Serial Number 330141/2001, filed Oct. 29, 2001, the subject matter of which is incorporated herein by reference.

2. Description of the Related Art

A simple type mobile phone system called PHS (Personal Handy phone System) is disclosed in the document, "Personal Handy phone System, RCR STD-28, Association of Radio Industries and Businesses". In this system, the base station and the mobile station communicate with each other using a frame which has a 5 msec (millisecond) length. This system has three stage protocol phases. One is a link channel establishment phase which establishes a handshake in a wireless section. Another is a service channel establishment phase which establishes a call-connection between the base station and the mobile station after the link channel establishment phase. The third is a communication phase which establishes the transmission of communications and data. The generic name for a channel using the base station and the mobile station in the link channel establishment phase is a logical control channel (LCCH). The logical control channel (LCCH) has a broadcast channel (BCCH) which is a downlink oneway channel for broadcasting control information from the base station to the mobile station. In the communication phase, the communication between the base station and the mobile station is established using a service channel (SCH).

However, the above document does not disclose a manner of receiving the communication data using the time intervals from the receiving control information to the control information to be received next.

SUMMARY OF THE INVENTION

According to one aspect of the present invention, there is provided a timing control circuit comprising a synchronous detecting portion which detects a synchronous pattern data of a receiving signal demodulated based on a first control signal and generates a detection result, a first counter portion which generates a first signal every first cycle based on the detection result, second counter portion which generates a second signal every a second cycle based on the detection result and a first controlling portion which generates the first control signal, based on the first and second signals.

BRIEF DESCRIPTION OF THE DRAWINGS

The novel features of the invention will become more fully appeared from the detailed description and appended claims which follow, and with reference to the accompanying drawings, in which:

DETAILED DESCRIPTION OF THE PREFERRED EMBODIMENTS

A timing control circuit of the present invention will be explained with the preferred embodiments of the present invention. In this specification, the timing control circuit of the present invention is provided in the mobile station. Of course, the timing control circuit can be provided in the base station instead of the mobile station. The invention is not limited to the specific embodiments. Moreover, not all the combinations of the characteristics of the present invention described in the embodiments are essential to the problem solving characteristics of the present invention.

Figure 1:
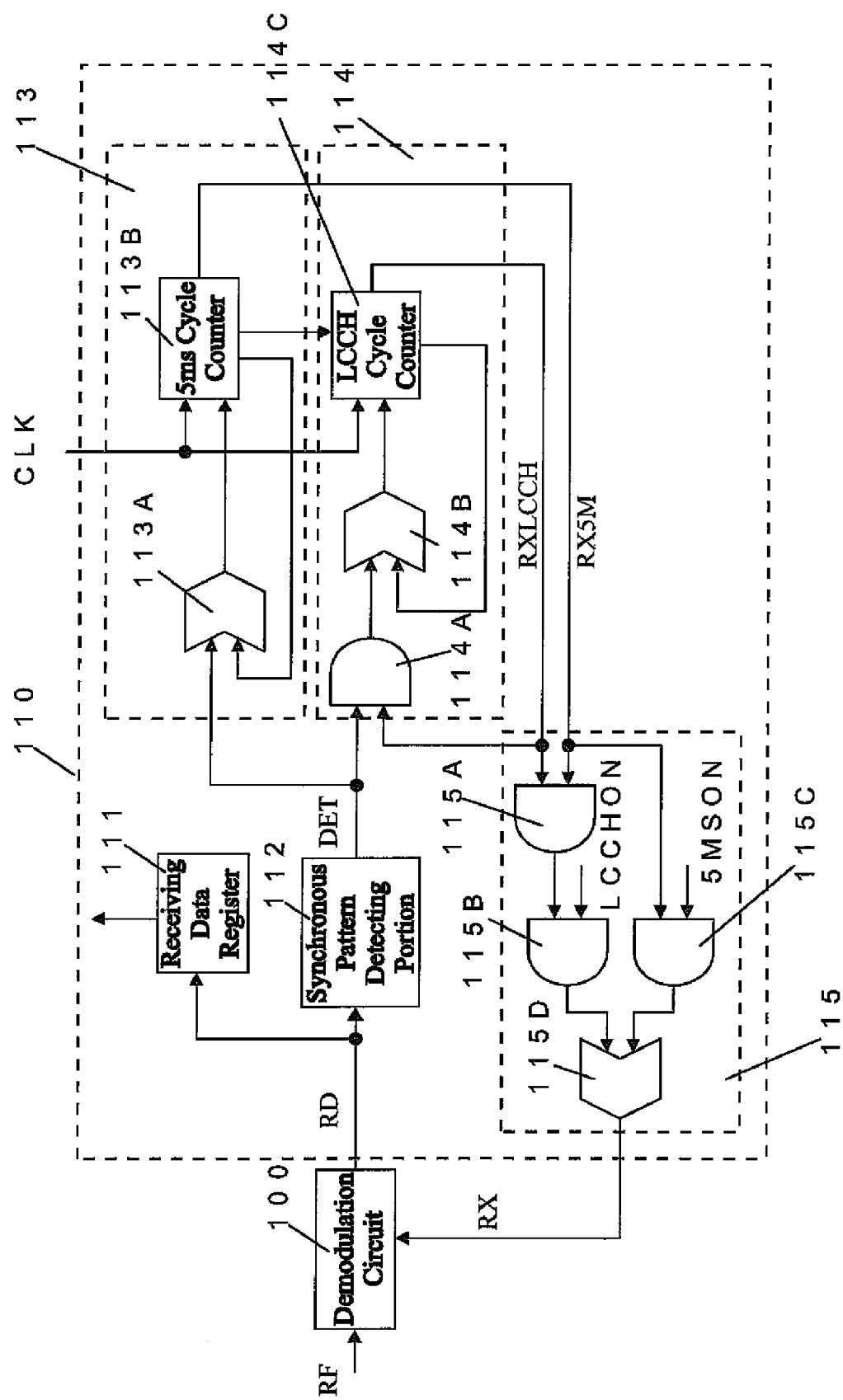
FIG. 1 is a block diagram showing a receiving circuit according to a first preferred embodiment of the present invention.
Figure 2:
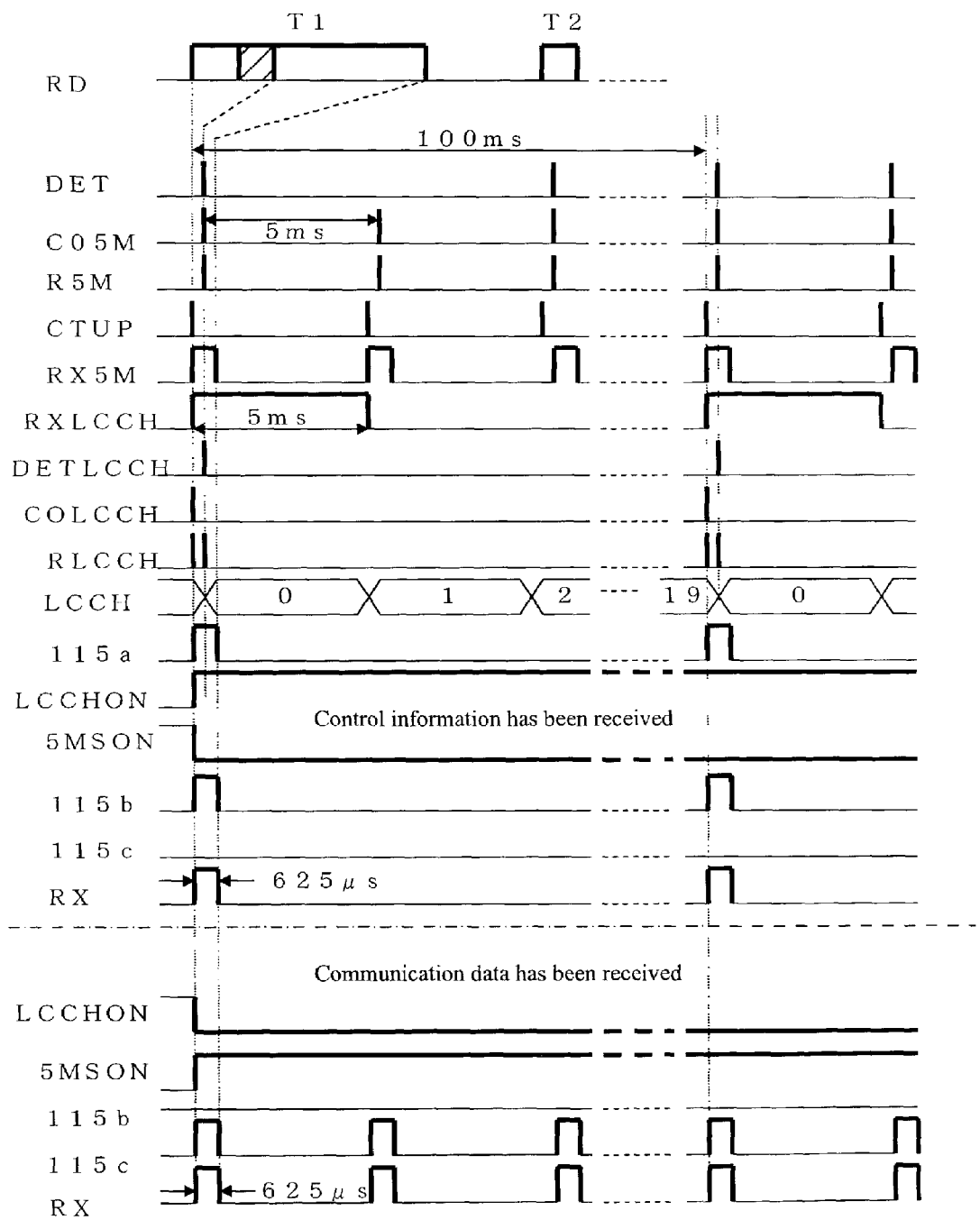
FIG. 2 is an operational diagram of the receiving circuit according to the first preferred embodiment of the present invention.

A timing control circuit and a method of timing control according to a first preferred embodiment of the present invention will be described with reference to FIGS. 1-2. FIG. 1 is a block diagram showing the receiving circuit according to the first preferred embodiment of the present invention. FIG. 2 is an operational diagram for explaining a method carried out by the receiving circuit according to the first preferred embodiment of the present invention.

First, the composition of the receiving circuit according to the first preferred embodiment of the present invention will be explained with reference to FIG. 1. The receiving circuit has a demodulation circuit 100 and a timing control circuit 110. The demodulation circuit 100 is input with a radio signal RF which is transmitted from the base station. The demodulation circuit 100 outputs a demodulated data RD by demodulating each frame data of a physical slot for control and a physical slot for communication which are assigned to the station, based on a control signal RX output from the timing control circuit 110. The radio signal RF is a signal which is modulated to a type of π/4 shift QPSK in the base station.

The timing control circuit 110 according to the first preferred embodiment of the present invention has a receiving data register (a data storing portion) 111, a synchronous pattern detecting portion (a synchronous detecting portion) 112, a first counter portion 113, a second counter portion 114 and a controlling portion 115.

The receiving data register 111 is connected with the demodulation circuit 100 and is input with the demodulated data RD. The receiving data register 111 stores the demodulated data RD temporally and outputs the stored demodulated data RD to a channel codec and a voice codec which are not shown in the figures.

The synchronous pattern detecting portion 112 is connected with the demodulation circuit 100 and is input with the demodulated data RD. The synchronous pattern detecting portion 112 detects a synchronous pattern data storing synchronous location information which is included in the demodulated data RD. When the descried synchronous pattern is detected, the synchronous pattern detecting portion 112 outputs a synchronous pattern signal DET which is a one-shot pulse temporarily having the supply voltage level ("H" level) for a short period of time. Otherwise, the synchronous pattern detecting portion 112 outputs the synchronous pattern signal DET of which voltage level is the ground voltage level ("L" level).

The first counter portion 113 is connected with the synchronous pattern detecting portion 112, counts a first cycle (5 ms: millisecond) based on voltage level of the synchronous pattern signal DET and outputs a first signal. The first signal is used for demodulating the radio signal RF every 5 ms in the demodulation circuit 100. The first counter portion 113 has an OR circuit 113A and a 5 ms cycle counter 113B. The OR circuit 113A is input with the synchronous pattern signal DET and a carry-out signal CO5M output by the 5 ms cycle counter 113B. The OR circuit 113A carries out a logical OR operation of the synchronous pattern signal DET and the carry-out signal CO5M and outputs a logical OR operation result R5M. The 5 ms cycle counter 113B is input with a clock signal CLK which is input with from the outside of the timing control circuit 110 and the logical OR operation result R5M. The 5 ms cycle counter 113B keeps counting the input clock signal CLK and keeps increasing a count value, until the logical OR operation result R5M having voltage level of "H" level is input. The 5 ms cycle counter 113B resets the counting value to a certain value when the logical OR operation result R5M having voltage level of "H" level is input. The 5 ms cycle counter 113B outputs a 5 ms cycle receiving timing signal (the first signal) RX5M, the carry-out signal CO5M and a count-up signal CTUP.

Next, the output timing of the 5 ms cycle receiving timing signal RX5M, the carry-out signal CO5M and the count-up signal CTUP will be explained with reference to FIG. 2. Each of the 5 ms cycle receiving timing signal RX5M and the count-up signal CTUP is a one-shot pulse signal which temporarily has voltage level of "H" level for a short period of time and is output in sync with the head of the demodulated data RD. The pulse length of the 5 ms cycle receiving timing signal RX5M is 625 μs (microsecond) from the head of the demodulated data RD. The carry-out signal CO5M is a one-shot pulse signal temporarily having voltage level of "H" level for a short period of time and is output in sync with the end of the synchronous pattern data of the demodulated data RD.

The second counter portion 114 is connected with the synchronous pattern detecting portion 112, counts a second cycle (100 ms) based on voltage level of the synchronous pattern signal DET and outputs a second signal. The second signal is used for demodulating the radio signal RF every 100 ms in the demodulation circuit 100. The second counter portion 114 has an AND circuit 114A, an OR circuit 114B and an LCCH cycle counter 114C. The AND circuit 114A is input with the synchronous pattern signal DET and an LCCH cycle receiving timing signal RXLCCH output by the LCCH cycle counter 114C. The AND circuit 114A carries out the logical AND operation of the synchronous pattern signal DET and the LCCH cycle receiving timing signal RXLCCH and outputs a logical AND operation result DETLCCH. The OR circuit 114B is input with the logical AND operation result DETLCCH and a carry-out signal COLCCH output by the LCCH cycle counter 114C. The OR circuit 114B carries out the logical OR operation of the logical AND operation result DETLCCH and the carry-out signal COLCCH and outputs a logical OR operation result RLCCH. The LCCH cycle counter 114C is input with the clock signal CLK, the logical OR operation result RLCCH and the count-up signal CTUP. The LCCH cycle counter 114C keeps counting the input count-up signal CTUP and keeps increasing a count value until the logical OR operation result RLCCH having voltage level of "H" level is input. The LCCH cycle counter 114C resets the counting value to a certain value when the logical OR operation result RLCCH having voltage level of "H" level is input. The LCCH cycle counter 114C outputs the LCCH cycle receiving timing signal RXLCCH and the carry-out signal COLCCH.

Next, the output timing of the LCCH cycle receiving timing signal RXLCCH and the carry-out signal COLCCH will be explained with reference to FIG. 2. Each of the LCCH cycle receiving timing signal RXLCCH and the carry-out signal COLCCH is a one-shot pulse signal which temporarily has voltage level of "H" level for a short period of time and is output in sync with the head of the demodulated data RD. The LCCH cycle receiving timing signal RXLCCH has voltage level of "H" level when the counting value of the LCCH cycle counter 114C is "0" (zero).

The controlling portion 115 is input with the 5 ms cycle receiving timing signal RX5M and the LCCH cycle receiving timing signal RXLCCH and outputs the control signal (clock signal) RX for controlling the demodulation circuit 100. The controlling portion 115 has AND circuits 115A, 115B, 115C and an OR circuit 115D. The AND circuit 115A is input with the 5 ms cycle receiving timing signal RX5M and the LCCH cycle receiving timing signal RXLCCH. The AND circuit 115A carries out the logical AND operation of the 5 ms cycle receiving timing signal RX5M and the LCCH cycle receiving timing signal RXLCCH and outputs a logical AND operation result 115a. The AND circuit 115B is input with the logical AND operation result 115a and a control signal LCCHON which is input from the outside of the timing control circuit 110. The AND circuit 115B carries out the logical AND operation of the logical AND operation result 115a and the control signal LCCHON and outputs a logical AND operation result 115b. The control signal LCCHON has voltage level of "H" level when the timing control circuit 110 receives a control information and has voltage level of "L" level when the timing control circuit 110 receives a communication data. The AND circuit 115C is input with the 5 ms cycle receiving timing signal RX5M and a control signal 5MSON which is input from the outside of the timing control circuit 110. The AND circuit 115C carries out the logical AND operation of the 5 ms cycle receiving timing signal RX5M and the control signal 5MSON and outputs a logical AND operation result 115c. The control signal 5MSON has voltage level of "L" level when the timing control circuit 110 receives the control information and has voltage level of "H" level when the timing control circuit 110 receives the communication data. The OR circuit 115D is input with the logical AND operation results 115b, 115c. The OR circuit 115D carries out the logical OR operation of the logical AND operation results 115b, 115c and outputs a logical OR operation result as the control signal RX. The control signal RX is a one-shot pulse signal temporarily having voltage level of "H" level for a short period of time. The pulse length of the control signal RX is 625 μs from the head of the demodulated data RD.

Next, an operation of the timing control circuit according to the first preferred embodiment of the present invention will be explained with reference to FIG. 2. The demodulated data RD as shown in FIG. 2 is a demodulated radio signal (burst signal) RF which is transferred from the base station at specified time intervals (T1, T2 ..., Ti). The demodulated data RD has a synchronous pattern data 200 containing storing the synchronous location information.

The operation of the timing control circuit 110 which is receiving the control information will first be explained. To receive the control information in an outside public telephone system, the receiving circuit having the timing control circuit 110 needs to receive and demodulate the radio signal RF every 100 ms. On the other hand, in a self-occupied telephone system (for homeuse or for officeuse, et. al), the receiving circuit needs to receive and demodulate the radio signal RF every 120 ms. The following relates to the operation of the timing control circuit 110 in the outside public telephone system.

The synchronous pattern detecting portion 112 detects the synchronous pattern data 200 of the demodulated data RD at time T1 and outputs the synchronous pattern signal DET which is a one-shot pulse temporarily having voltage level of "H" level for a short period of time. On the other hand, the receiving data register 111 temporarily stores the demodulated data RD as it is.

The OR circuit 113A of the first counter portion 113 carries out the logical OR operation of the synchronous pattern signal DET and the carry-out signal CO5M and outputs a logical OR operation result R5M having voltage level of "H" level. Once the 5 ms cycle counter 113B is input with the synchronous pattern signal DET, the 5 ms cycle counter 113B keeps outputting the carry-out signal CO5M which is a one-shot pulse signal having voltage level of "H" level every 5ms after the synchronous pattern signal DET is detected. The 5 ms cycle counter 113B keeps counting the input clock signal CLK and keeps increasing a count value until the logical OR operation result R5M having voltage level of "H" level is input. The 5 ms cycle counter 113B resets the counting value to a certain value when the logical OR operation result R5M having voltage level of "H" level is input. The 5 ms cycle counter 113B outputs the 5 ms cycle receiving timing signal RX5M and the count-up signal CTUP, which is a one-shot pulse signal having voltage level of "H" level, in sync with the head of the demodulated data RD after time T1. The pulse length of the 5 ms cycle receiving timing signal RX5M is 625 μs from the head of the demodulated data RD.

The AND circuit 114A of the second counter portion 114 carries out the logical AND operation of the synchronous pattern signal DET and the LCCH cycle receiving timing signal RXLCCH and outputs the logical AND operation result DETLCCH having voltage level of "H" level. The OR circuit 114B carries out the logical OR operation of the logical AND operation result DETLCCH and the carry-out signal COLCCH and outputs the logical OR operation result RLCCH having voltage level of "H" level. The OR circuit 114B twice outputs the logical OR operation result RLCCH which is a one-shot pulse signal having voltage level of "H" level every 100 ms (times T1, Ti). Once the LCCH cycle counter 114C is input with the logical OR operation result RLCCH, the LCCH cycle counter 114C keeps outputting the carry-out signal COLCCH which is a one-shot pulse signal having voltage level of "H" level every 100 ms after the head of the demodulated data RD. The LCCH cycle counter 114C keeps counting the input count-up signal CTUP and keeps increasing a count value until the logical OR operation result RLCCH having voltage level of "H" level is input. The LCCH cycle counter 114C resets the counting value to a certain value when the logical OR operation result RLCCH having voltage level of "H" level is input. The LCCH cycle counter 114C outputs the LCCH cycle receiving timing signal RXLCCH which is a one-shot pulse signal having voltage level of "H" level for 5 ms when the LCCH cycle counter 114C is "0" (zero) after time T1.

The AND circuit 115A of the controlling portion 115 carries out the logical AND operation of the 5 ms cycle receiving timing signal RX5M and the LCCH cycle receiving timing signal RXLCCH and outputs the logical AND operation result 115a having voltage level of "H" level. The AND circuit 115B carries out the logical AND operation of the logical AND operation result 115a and the control signal LCCHON having voltage level of "H" level and outputs the logical AND operation result 115b which is a one-shot pulse signal having voltage level of "H" level. The pulse length of the logical AND operation result 115b is 625 μs from the head of the demodulated data RD. The control signal LCCHON always has voltage level of "H" level when the timing control circuit 110 receives the control information. The AND circuit 115C carries out the logical AND operation of the 5 ms cycle receiving timing signal RX5M and the control signal 5MSON having voltage level of "L" level and outputs the logical AND operation result 115c having voltage level of "L" level. The control signal 5MSON always has voltage level of "L" level when the timing control circuit 110 receives the control information. The OR circuit 115D carries out the logical OR operation of the logical AND operation results 115b, 115c and outputs the control signal RX which is a one-shot pulse signal temporarily having voltage level of "H" level. The pulse length of the control signal RX is 625 μs from the head of the demodulated data RD. Voltage level of the control signal RX depends on voltage level of the logical AND operation result 115b, because the logical AND operation result 115c always has voltage level of "L" level. The timing control circuit 110 can output the control signal RX every 100 ms which is a one-shot pulse signal of which the pulse length is 625 μs from the head of the demodulated data RD. Therefore, the demodulation circuit 100 can receive and demodulate the radio signal RF to obtain the demodulated data RD every 100 ms.

Next, an operation of the timing control circuit 110 which is receiving the communication data will be explained. To receive the communication data, the receiving circuit having the timing control circuit 110 needs to receive and demodulate the radio signal RF every 5 ms. The difference between the operation of the timing control circuit 110 which is receiving the control information and the operation of the timing control circuit 110 which is receiving the communication data is voltage levels of the control signals LCCHON, 5MSON. Therefore, only the operation of the controlling portion 115 will be explained as follows.

The AND circuit 115B carries out the logical AND operation of the logical AND operation result 115a and the control signal LCCHON having voltage level of "L" level and outputs the logical AND operation result 115b having voltage level of "L" level. The control signal LCCHON always has voltage level of "L" level when the timing control circuit 110 receives the communication data. The AND circuit 115C carries out the logical AND operation of the 5 ms cycle receiving timing signal RX5M and the control signal 5MSON having voltage level of "H" level and outputs the logical AND operation result 115c which is a one-shot pulse signal having voltage level of "H" level. The pulse length of the logical AND operation result 115C is 625 μs from the head of the demodulated data RD. The control signal 5MSON always has voltage level of "H" level when the timing control circuit 110 receives the communication data. The OR circuit 115D carries out the logical OR operation of the logical AND operation results 115b, 115c and outputs the control signal RX which is a one-shot pulse signal temporarily having voltage level of "H" level. The pulse length of the control signal RX is 625 μs from the head of the demodulated data RD. Voltage level of the control signal RX depends on voltage level of the logical AND operation result 115c, because the logical AND operation result 115b always has voltage level of "L" level. The timing control circuit 110 can output the control signal RX every 5 ms which is a one-shot pulse signal of which the pulse length is 625 μs from the head of the demodulated data RD. Therefore, the demodulation circuit 100 can receive and demodulate the radio signal RF and get the demodulated data RD every 5 ms.

The timing control circuit according to the first preferred embodiment of the present invention changes voltage level of the control signal for controlling the demodulated circuit, according to change voltage levels of the control signals input to the timing control circuit. Therefore, the receiving circuit having the timing control circuit according to the first preferred embodiment of the present invention receives and demodulates both of the control information and the communication data, based on changing voltage levels of two control signals in the timing control circuit. Thus, the mobile station demodulates the communication data correctly when the base station transfers the communication data instead of the control information in LCCH cycle. In addition, the mobile station receives the communication data using the time intervals from the receiving control information to the control information to be received next, based on changing voltage levels of the two control signals.

Figure 3:
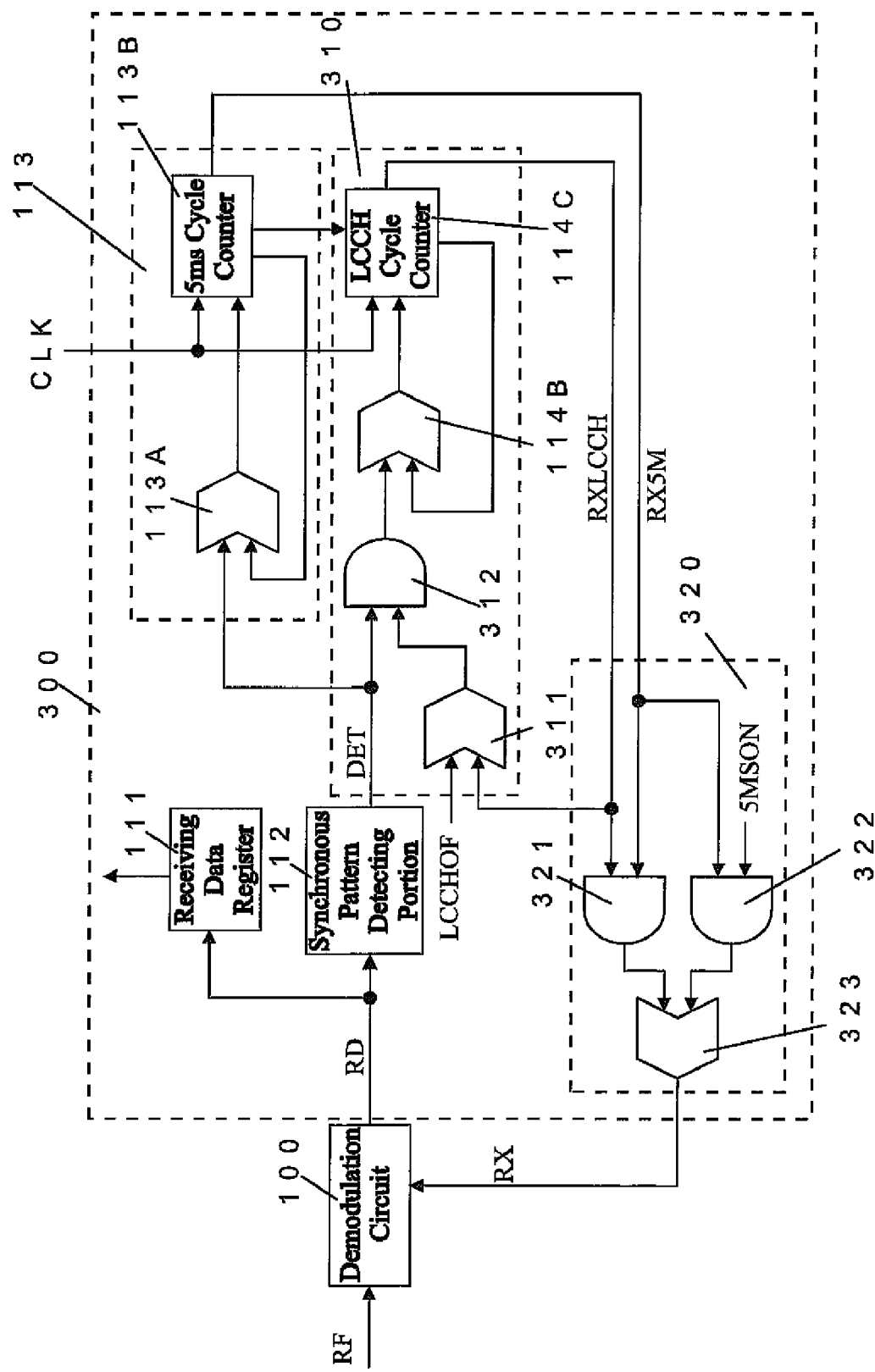
FIG. 3 is a block diagram showing a receiving circuit according to a second preferred embodiment of the present invention.
Figure 4:
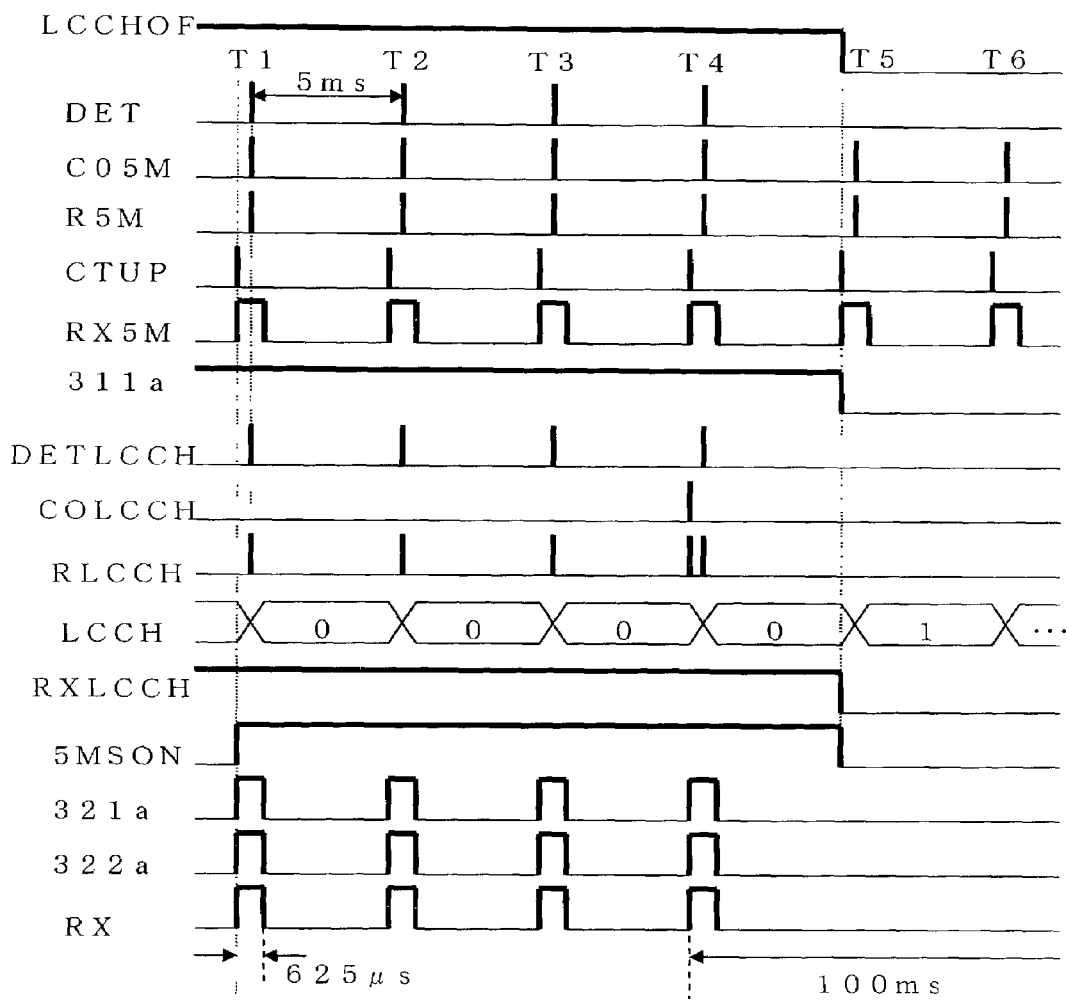
FIG. 4 is an operational diagram of the receiving circuit according to the second preferred embodiment of the present invention.

A timing control circuit and a method of timing control according to a second preferred embodiment of the present invention will be described with reference to FIGS. 3-4. FIG. 3 is a block diagram showing the receiving circuit according to the second preferred embodiment of the present invention. FIG. 4 is an operational diagram for explaining a method carried out by the receiving circuit according to the second preferred embodiment of the present invention. Like elements are given like or corresponding reference numerals in the first and second preferred embodiments. Thus, dual explanations of the same elements are avoided.

First, the composition of the receiving circuit according to the second preferred embodiment of the present invention will be explained with reference to FIG. 3. The receiving circuit has a demodulation circuit 100 and a timing control circuit 300.

The timing control circuit 300 according to the second preferred embodiment of the present invention has a receiving data register (a data storing portion) 111, a synchronous pattern detecting portion (a synchronous detecting portion) 112, a first counter portion 113, a second counter portion 310 and a controlling portion 320.

The second counter portion 310 is connected with the synchronous pattern detecting portion 112, counts a second cycle (100 ms) based on voltage level of the synchronous pattern signal DET and outputs a second signal. The second signal is used for demodulating the radio signal RF every 100 ms in the demodulation circuit 100. The second counter portion 310 has the OR circuits 114B, 311, an AND circuit 312 and the LCCH cycle counter 114C. The OR circuit 311 is input with a control signal LCCHOF which is input from the outside of the timing control circuit 300 and an LCCH cycle receiving timing signal RXLCCH output by the LCCH cycle counter 114C. The OR circuit 311 carries out a logical OR operation of the control signal LCCHOF and the LCCH cycle receiving timing signal RXLCCH and outputs a logical OR operation result 311a. The control signal LCCHOF has voltage level of "H" level until the timing control circuit 300 receives a control information correctly and has voltage level of "L" level after that. The AND circuit 312 is input with the synchronous pattern signal DET and the logical OR operation result 311a. The AND circuit 312 carries out the logical AND operation of the synchronous pattern signal DET and the logical OR operation result 311a and outputs a logical AND operation result DETLCCH. The LCCH cycle counter 114C outputs the LCCH cycle receiving timing signal RXLCCH and the carry-out signal COLCCH. The LCCH cycle receiving timing signal RXLCCH has voltage level of "H" level when the counting value of the LCCH cycle counter 114C is "0". Therefore, the timing control circuit 300 keeps the counting value "0" and the LCCH cycle receiving timing signal RXLCCH having voltage level of "H" level outputting, until the timing control circuit 300 receives the control information correctly.

The controlling portion 320 is input with the 5 ms cycle receiving timing signal RX5M and the LCCH cycle receiving timing signal RXLCCH and outputs the control signal (clock signal) RX for controlling the demodulation circuit 100. The controlling portion 320 has the AND circuits 321, 322 and an OR circuit 323. The AND circuit 321 is input with the 5 ms cycle receiving timing signal RX5M and the LCCH cycle receiving timing signal RXLCCH. The AND circuit 321 carries out the logical AND operation of the 5 ms cycle receiving timing signal RX5M and the LCCH cycle receiving timing signal RXLCCH and outputs a logical AND operation result 321a. The AND circuit 322 is input with the 5 ms cycle receiving timing signal RX5M and a control signal 5MSON which is input from the outside of the timing control circuit 300. The AND circuit 322 carries out the logical AND operation of the 5 ms cycle receiving timing signal RX5M and the control signal 5MSON and outputs a logical AND operation result 322a. The control signal 5MSON has voltage level of "H" level until the timing control circuit 300 receives the control information correctly and has voltage level of "L" level after that. The OR circuit 323 is input with the logical AND operation results 321a, 322a. The OR circuit 323 carries out the logical OR operation of the logical AND operation results 321a, 322a and outputs a logical OR operation result as the control signal RX every 5 ms until the timing control circuit 300 receives the control information correctly. The control signal RX is a one-shot pulse signal temporarily having voltage level of "H" level. The pulse length of the control signal RX is 625 μs from the head of the demodulated data RD.

Next, an operation of the timing control circuit according to the second preferred embodiment of the present invention will be explained with reference to FIG. 4. The following explanation is an explanation of an operation until the timing control circuit starts to communicate with the control information from it receives the control information correctly. Like elements are given like or corresponding reference numerals in the first and second preferred embodiments. Thus, dual explanations of the same elements and operations are avoided.

The synchronous pattern detecting portion 112 detects the synchronous pattern data of the demodulated data RD every times T1, T2, . . . , T4 and outputs the synchronous pattern signal DET which is a one-shot pulse temporarily having voltage level of "H" level for a short period of time.

The OR circuit 311 of the second counter portion 310 carries out a logical OR operation of the control signal LCCHOF and the LCCH cycle receiving timing signal RXLCCH. For times T1-T4, the timing control circuit 300 does not receive the control information correctly, so each of the control signal LCCHOF and the LCCH cycle receiving timing signal RXLCCH has voltage level of "H" level. Therefore, the OR circuit 311 outputs the logical OR operation result 311a having voltage level of "H" level for that. After time T5, the timing control circuit 300 receives the control information correctly, so each of the control signal LCCHOF and the LCCH cycle receiving timing signal RXLCCH has voltage level of "L" level. Therefore, the OR circuit 311 outputs the logical OR operation result 311a having voltage level of "L" level after that.

The AND circuit 312 of the second counter portion 310 carries out a logical AND operation of the synchronous pattern signal DET and the logical OR operation result 311a. For times T1-T4, the logical OR operation result 311a has voltage level of "H" level. Therefore, voltage level of the logical AND operation result DETLCCH output by the AND circuit 312 corresponds to voltage level of the synchronous pattern signal DET for that. Thus, the AND circuit 312 outputs the logical AND operation result DETLCCH which is a one-shot pulse signal having voltage level of "H" level for that, based on voltage level of the synchronous pattern signal DET. After time T5, the timing control circuit 300 receives the control information correctly, so the logical OR operation result 311a has voltage level of "L" level. Therefore, the AND circuit 312 outputs the logical AND operation result DETLCCH having voltage level of "L" level after that.

The OR circuit 114B of the second counter portion 310 carries out the logical OR operation of the logical AND operation result DETLCCH and the carry-out signal COLCCH. When the timing control circuit 300 does not receive the control information(for times T1-T4), the carry-out signal COLCCH has voltage level of "L" level. Therefore, the OR circuit 114B outputs the logical OR operation result RLCCH which is a one-shot pulse signal having voltage level of "H" level every 5 ms, based on voltage level of the logical AND operation result DETLCCH. At time T5, the LCCH cycle counter 114C outputs the carry-out signal COLCCH which is a one-shot pulse having voltage level of "H" level. Therefore, at time T5, the OR circuit 114B twice outputs the logical OR operation result RLCCH which is a one-shot pulse signal having voltage level of "H" level.

For times T1-T4, the LCCH cycle counter 114C is input with the logical OR operation result RLCCH which is a one-shot pulse signal having voltage level of "H" level every 5 ms. The LCCH cycle counter 114C resets the counting value to a certain value (ex. "0") every inputting the logical OR operation result RLCCH. In other words, for that, the counting value is always "0". At time T4, when the LCCH cycle counter 114C receives the control information correctly, the LCCH cycle counter 114C outputs the carry-out signal COLCCH which is a one-shot pulse signal having voltage level of "H" level every 100 ms after that.

The AND circuit 321 of the controlling portion 320 carries out the logical AND operation of the 5 ms cycle receiving timing signal RX5M and the LCCH cycle receiving timing signal RXLCCH and outputs a logical AND operation result 321a. For times T1-T4, the LCCH cycle receiving timing signal RXLCCH has voltage level of "H" level. So, voltage level of the logical AND operation result 321a depends on voltage level of the 5 ms cycle receiving timing signal RX5M. Therefore, the AND circuit 321 outputs the logical AND operation result 321a which is a one-shot pulse signal having voltage level of "H" level every 5 ms, based on voltage level of the 5 ms cycle receiving timing signal RX5M. On the other hand, after time T5, the LCCH cycle receiving timing signal RXLCCH has voltage level of "L" level. After time T5, the logical AND circuit 321 outputs the logical AND operation result 321a of which voltage level is "L" level.

The AND circuit 322C carries out the logical AND operation of the 5 ms cycle receiving timing signal RX5M and the control signal 5MSON and outputs the logical AND operation result 322a. Until the receiving circuit receives the control information correctly (for times T1-T4), the control signal 5MSON has voltage level of "H" level. So, voltage level of the logical AND operation result 322a depends on voltage level of the 5 ms cycle receiving timing signal RX5M. Therefore, the AND circuit 322 outputs the logical AND operation result 322a which is a one-shot pulse signal having voltage level of "H" level every 5 ms, based on voltage level of the 5 ms cycle receiving timing signal RX5M. On the other hand, after the receiving circuit receives the control information correctly (after time T5), the control signal 5MSON has voltage level of "L" level. After time T5, the logical AND circuit 322 outputs the logical AND operation result 322a of which voltage level is "L" level.

The OR circuit 323 carries out the logical OR operation of the logical AND operation results 321a, 322a and outputs the control signal RX. For times T1-T4, the OR circuit 323 outputs the control signal RX which is a one-shot pulse signal temporarily having voltage level of "H" level. The pulse length of the control signal RX is 625 μs. After time T5, both of the logical AND operation results 321a, 322a have voltage level of "L" level. Then, the OR circuit 323 outputs having voltage level of "L" level, until either of the logical AND operation results 321a, 322a has voltage level of "H" level after 100 ms at least. Therefore, the demodulation circuit 100 receives and demodulates the radio signal RF to obtain the demodulated data RD every 100 ms.

By the way, the timing control circuit 300 according to the second preferred embodiment of the present invention receives the communication data when the control signal LCCHOF has voltage level of "L" level and when the control signal 5MSON has voltage level of "H" level.

The timing control circuit according to the second preferred embodiment of the present invention easily receives the control information based on the adjusting to voltage level of the control signal, even if it is difficult to catch the control information. In addition, the timing control circuit receives the communication data using the time intervals from the receiving control information to the control information to be received next, based on changing voltage levels of the control signal.

Figure 5:
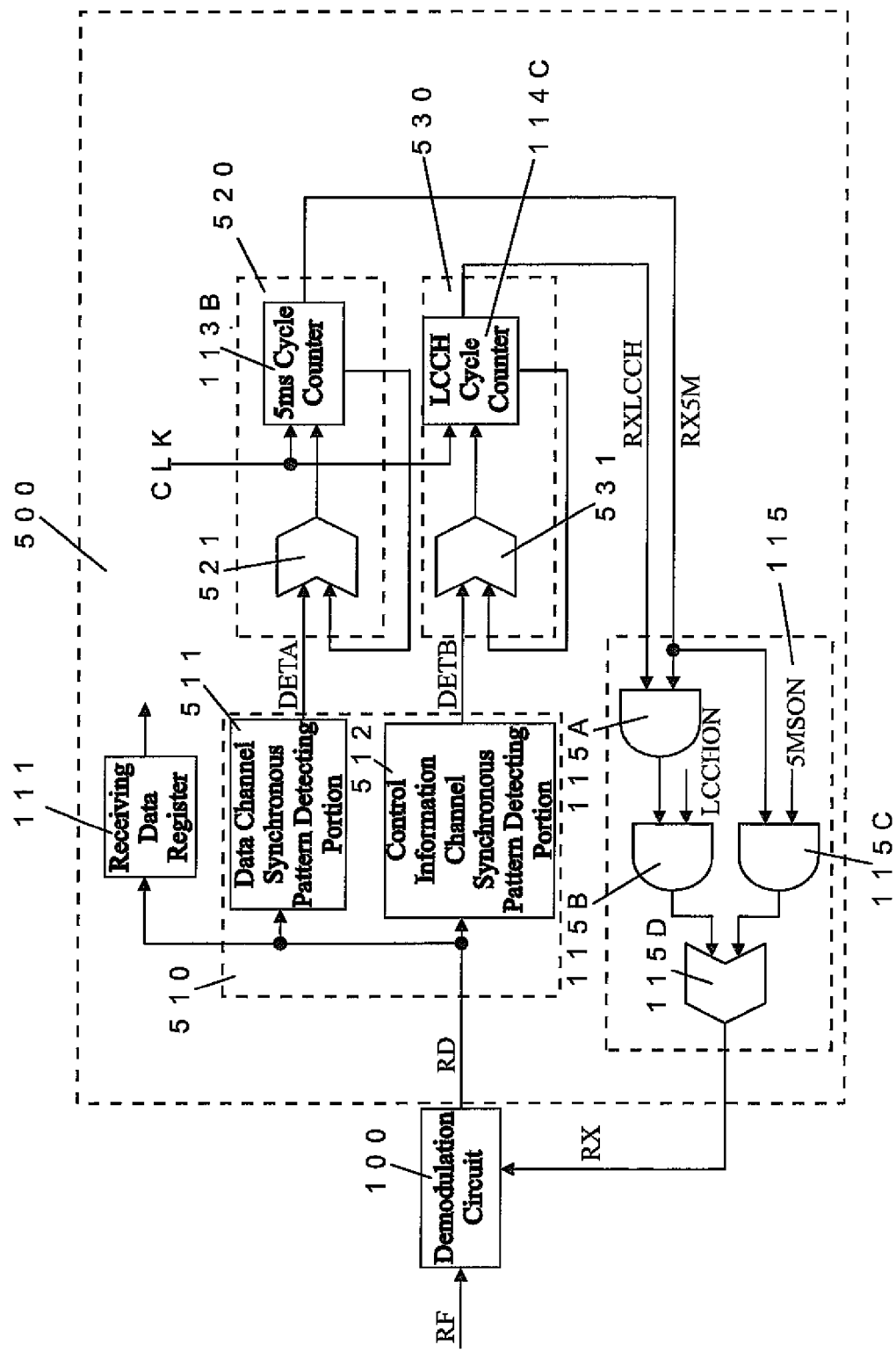
FIG. 5 is a block diagram showing a receiving circuit according to a third preferred embodiment of the present invention.
Figure 6:
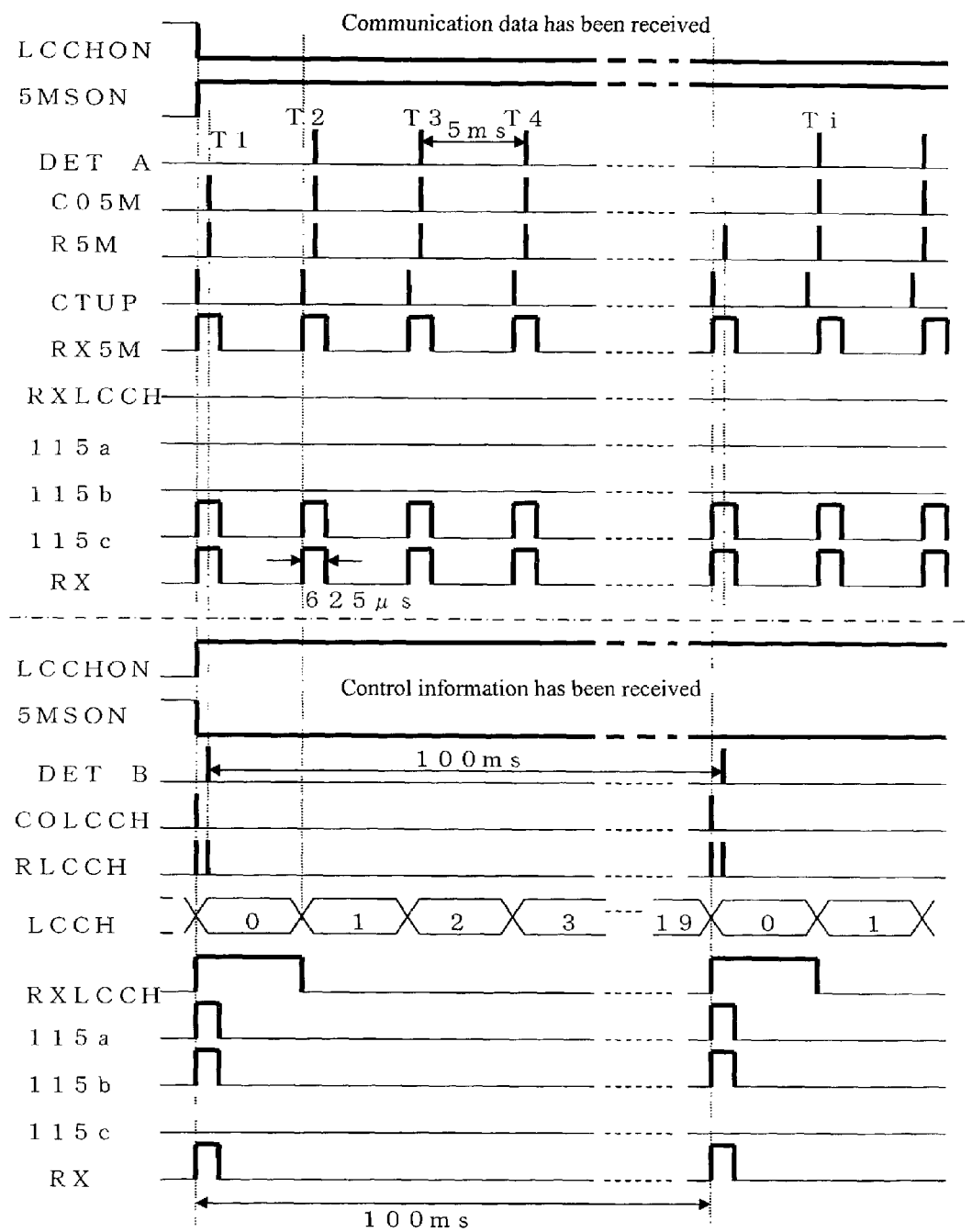
FIG. 6 is an operational diagram of the receiving circuit according to a third preferred embodiment of the present invention.

A timing control circuit and a method of timing control according to a third preferred embodiment of the present invention will be described with reference to FIGS. 5-6. FIG. 5 is a block diagram showing the receiving circuit according to the third preferred embodiment of the present invention. FIG. 6 is an operational diagram for explaining a method carried out by the receiving circuit according to the third preferred embodiment of the present invention. Like elements are given like or corresponding reference numerals in the above preferred embodiments. Thus, dual explanations of the same elements are avoided.

First, the composition of the receiving circuit according to the third preferred embodiment of the present invention will be explained with reference to FIG. 5. The receiving circuit has a demodulation circuit 100 and a timing control circuit 500.

The timing control circuit 500 according to the third preferred embodiment of the present invention has a receiving data register (a data storing portion) 111, a synchronous pattern detecting portion (a synchronous detecting portion) 510, a first counter portion 520, a second counter portion 530 and a controlling portion 115.

The synchronous pattern detecting portion 510 is connected with the demodulation circuit 100 and is input with the demodulated data RD. The synchronous pattern detecting portion 510 has a data channel synchronous pattern detecting portion (a first synchronous detecting portion) 511 and a control information channel synchronous pattern detecting portion (a second synchronous detecting portion) 512.

The data channel synchronous pattern detecting portion 511 detects a synchronous pattern data (16 bits) which is included in the demodulated data RD demodulated the communication data. The data channel synchronous pattern detecting portion 511 detects 16 bits from the head of the synchronous pattern data as the synchronous pattern data. The data channel synchronous pattern detecting portion 511 outputs a synchronous pattern signal (a first detecting signal) DETA which is a one-shot pulse signal temporarily having voltage level of "H" level for a short period of time, when it detects a wished synchronous information (the synchronous pattern data of the communication data). On the other hand, the data channel synchronous pattern detecting portion 511 outputs a synchronous pattern signal DETA having voltage level of "L" level, when it does not detect the wished synchronous information. By the way, a synchronous pattern data indicating synchronous location information of the control information is comprised 32 bits. The data length of the synchronous pattern data of the control information and the communication data differ from each other. So, even if the synchronous pattern data of the control information is input into the data channel synchronous pattern detecting portion 511, the synchronous pattern signal DETA is not output correctly. Therefore, the data channel synchronous pattern detecting portion 511 detects the only synchronous pattern data of the communication data.

The control information channel synchronous pattern detecting portion 512 detects a synchronous pattern data (32 bits) which is included in the demodulated data RD demodulated the control information. The control information channel synchronous pattern detecting portion 512 detects 32 bits from the head of the synchronous pattern data as the synchronous pattern data. When the desired synchronous information (the synchronous pattern data of the control information) is detected, the control information channel synchronous pattern detecting portion 512 outputs a synchronous pattern signal (a second detecting signal) DETB which is a one-shot pulse signal temporarily having voltage level of "H" level for a short period of time. Otherwise, the control information channel synchronous pattern detecting portion 512 outputs a synchronous pattern signal DETB having voltage level of "L" level. As mentioned above, the data length of the synchronous pattern data of the control information and the communication data differ from each other. So, even if the synchronous pattern data of the communication data is input into the control information channel synchronous pattern detecting portion 512, the synchronous pattern signal DETB is not output correctly. Therefore, the control information channel synchronous pattern detecting portion 512 detects the only synchronous pattern data of the control information.

The first counter portion 520 is connected with the data channel synchronous pattern detecting portion 511, counts a first cycle (5 ms) based on voltage level of the synchronous pattern signal DETA and outputs a first signal. The first signal is used for demodulating the radio signal RF every 5 ms in the demodulation circuit 100. The first counter portion 520 has a OR circuit 521 and the 5 ms cycle counter 113B. The OR circuit 521 is input the synchronous pattern signal DETA and the carry-out signal CO5M output by the 5 ms cycle counter 113B. The OR circuit 521 carries out the logical OR operation of the synchronous pattern signal DETA and the carry-out signal CO5M and outputs a logical OR operation result R5M.

The second counter portion 530 is connected with the control information channel synchronous pattern detecting portion 512, counts a second cycle (100 ms) based on voltage level of the synchronous pattern signal DETB and outputs a second signal. The second signal is used for demodulating the radio signal RF every 100 ms in the demodulation circuit 100. The second counter portion 530 has a OR circuit 531 and the LCCH cycle counter 114C. The OR circuit 531 is input with the synchronous pattern signal DETB and the carry-out signal COLCCH output by the LCCH cycle counter 114C. The OR circuit 531 carries out the logical OR operation of the synchronous pattern signal DETB and the carry-out signal COLCCH and outputs a logical OR operation result RLCCH.

Next, an operation of the timing control circuit according to the third preferred embodiment of the present invention will be explained with reference to FIG. 6. Like elements are given like or corresponding reference numerals in the above preferred embodiments. Thus, dual explanations of the same elements and operations are avoided. The receiving circuit receives the control information at times T1, Ti, and receives the communication data at times T2-T4.

At first, the operation of the timing control circuit 500 which is receiving the communication data (times T2-T4) will be explained.

The data channel synchronous pattern detecting portion 511 detects the synchronous pattern data (16 bits) correctly and outputs the synchronous pattern signal DETA which is a one-shot pulse signal temporarily having voltage level of "H" level for a short period of time. By the way, the control information channel synchronous pattern detecting portion 512 does not detect the synchronous pattern data (32 bits) correctly and outputs the synchronous pattern signal DETB having voltage level of "L" level.

The OR circuit 521 of the first counter portion 520 carries out a logical OR operation of the synchronous pattern signal DETA and the carry-out signal CO5M and outputs the logical OR operation result R5M which is a one-shot pulse signal temporarily having voltage level of "H" level for a short period of time. On the other hand, the second counter portion 530 outputs the LCCH cycle receiving timing signal RXLCCH having voltage level of "L" level, because both the synchronous pattern signal DETB and the carry-out signal COLCCH have voltage level of "L" level.

The AND circuit 115A of the controlling portion 115 carries out a logical AND operation of the 5 ms cycle receiving timing signal RX5M and the LCCH cycle receiving timing signal RXLCCH and outputs a logical AND operation result 115a. The LCCH cycle receiving timing signal RXLCCH has voltage level of "L" level. Therefore, the AND circuit 115A outputs the logical AND operation result 115a having voltage level of "L" level. The AND circuit 115B carries out the logical AND operation of the logical AND operation result 115a and the control signal LCCHON and outputs a logical AND operation result 115b. Both the logical AND operation result 115a and the control signal LCCHON have voltage level of "L" level. Therefore, the AND circuit 115B outputs the logical AND operation result 115b having voltage level of "L" level. The control signal LCCHON always has voltage level of "L" level when the timing control circuit 500 receives the communication data. The AND circuit 115C carries out a logical AND operation of the 5 ms cycle receiving timing signal RX5M and the control signal 5MSON and outputs a logical AND operation result 115c. The control signal 5MSON has voltage level of "H" level when the timing control circuit 500 receives the communication data. So, voltage level of the logical AND operation result 115c depends on voltage level of the 5 ms cycle receiving timing signal RX5M. Therefore, the AND circuit 115C outputs the logical AND operation result 115c which is a one-shot pulse signal having voltage level of "H" level every 5 ms, based on voltage level of the 5 ms cycle receiving timing signal RX5M.

The OR circuit 115D carries out a logical OR operation of the logical AND operation results 115b, 115c and outputs the control signal RX. The logical AND operation results 115b has voltage level of "L" level when the timing control circuit 500 receives the communication data. So, voltage level of the control signal RX depends on voltage level of the logical AND operation result 115c. Therefore, the AND circuit 115D outputs the control signal RX which is a one-shot pulse signal temporarily having voltage level of "H" level every 5 ms, based on the logical AND operation result 115c. The pulse length of the control signal RX is 625 µs. Therefore, the demodulation circuit 100 receives and demodulates the radio signal RF to get the demodulated data RD every 5 ms.

Next, the operation of the timing control circuit 500 which is receiving the control information (times T1, Ti) will be explained.

The control information channel synchronous pattern detecting portion 512 detects the synchronous pattern data (32 bits) correctly and outputs the synchronous pattern signal DETB which is a one-shot pulse signal temporarily having voltage level of "H" level for a short period of time. By the way, the data channel synchronous pattern detecting portion 511 does not detect the synchronous pattern data (16 bits) correctly and outputs the synchronous pattern signal DETA having voltage level of "L" level.

The OR circuit 521 of the first counter portion 520 carries out a logical OR operation of the synchronous pattern signal DETA and the carry-out signal CO5M and outputs the logical OR operation result R5M. The synchronous pattern signal DETA has voltage level of "L" level when the timing control circuit 500 receives the control information. So, voltage level of the logical OR operation result R5M depends on voltage level of the carry-out signal CO5M. The OR circuit 521 outputs the logical OR operation result R5M which is a one-shot pulse signal having voltage level of "H" level, based on voltage level of the carry-out signal CO5M. Therefore, the first counter portion 520 outputs the 5 ms cycle receiving timing signal RX5M which is a one-shot pulse signal temporarily having voltage level of "H" level. On the other hand, the OR circuit 531 of the second counter portion 530 carries out the logical OR operation of the synchronous pattern signal DETB and the carry-out signal COLCCH and outputs the logical OR operation result RLCCH. Both the synchronous pattern signal DETB and the carry-out signal COLCCH have voltage level of "H" level. The OR circuit 531 outputs the logical OR operation result RLCCH which is a one-shot pulse signal having voltage level of "H" level, two times. The LCCH cycle counter 114C resets the counting value to a certain value. Therefore, the LCCH cycle counter 114C outputs the LCCH cycle receiving timing signal RXLCCH which is a one-shot pulse signal having voltage level of "H" level when the counting value is the certain value.

The AND circuit 115A of the controlling portion 115 carries out a logical AND operation of the 5 ms cycle receiving timing signal RX5M and the LCCH cycle receiving timing signal RXLCCH and outputs a logical AND operation result 115a which is a one-shot pulse signal having voltage level of "H" level. The pulse length of the logical AND operation result 115a is 625 µs. The AND circuit 115B carries out the logical AND operation of the logical AND operation result 115a and the control signal LCCHON and outputs a logical AND operation result 115b. The control signal LCCHON has voltage level of "H" level. So, voltage level of the logical AND operation result 115b depends on voltage level of the logical AND operation result 115a. Therefore, the AND circuit 115B outputs the logical AND operation result 115b which is a one-shot pulse signal having voltage level of "H" level, based on voltage level of the logical AND operation result 115a. The AND circuit 115C carries out a logical AND operation of the 5 ms cycle receiving timing signal RX5M and the control signal 5MSON and outputs a logical AND operation result 115c. The control signal 5MSON has voltage level of "L" level. Therefore, the AND circuit 115C outputs the logical AND operation result 115c having voltage level of "L" level. The OR circuit 115D carries out the logical OR operation of the logical AND operation results 115b, 115c and outputs the control signal RX. The logical AND operation results 115c has voltage level of "L" level when the timing control circuit 500 receives the control information. So, voltage level of the control signal RX depends on voltage level of the logical AND operation result 115b. Therefore, the AND circuit 115D outputs the control signal RX which is a one-shot pulse signal temporarily having voltage level of "H" level every 5 ms, based on the logical AND operation result 115b. The pulse length of the control signal RX is 625 µs. Therefore, the demodulation circuit 100 receives and demodulates the radio signal RF to get the demodulated data RD every 100 ms.

The timing control circuit according to the third preferred embodiment of the present invention receives the communication data using the time intervals from the receiving control information to the control information to be received next, based on changing voltage levels of the control signal.

Figure 7:
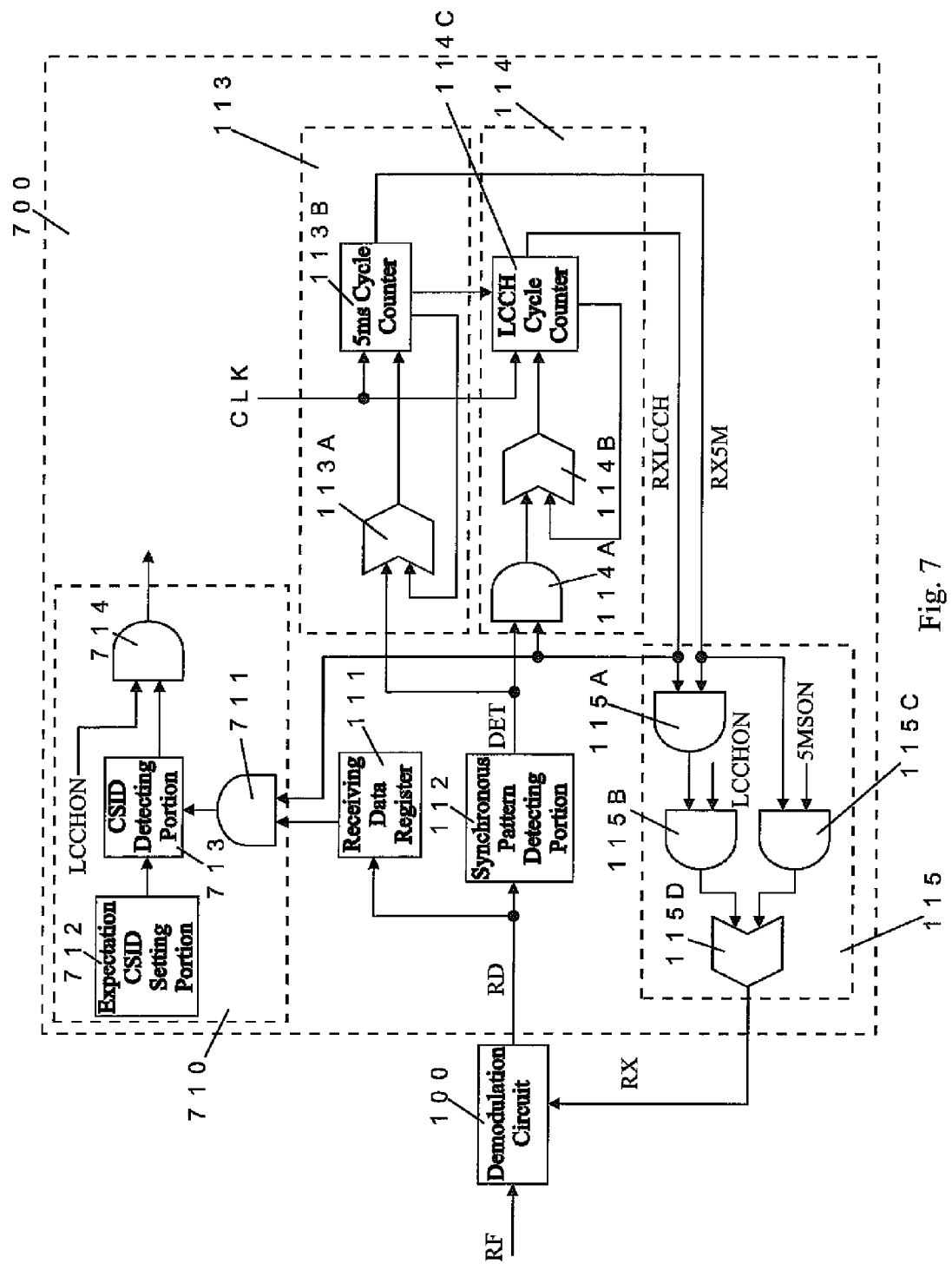
FIG. 7 is a block diagram showing a receiving circuit according to a fourth preferred embodiment of the present invention.
Figure 8:
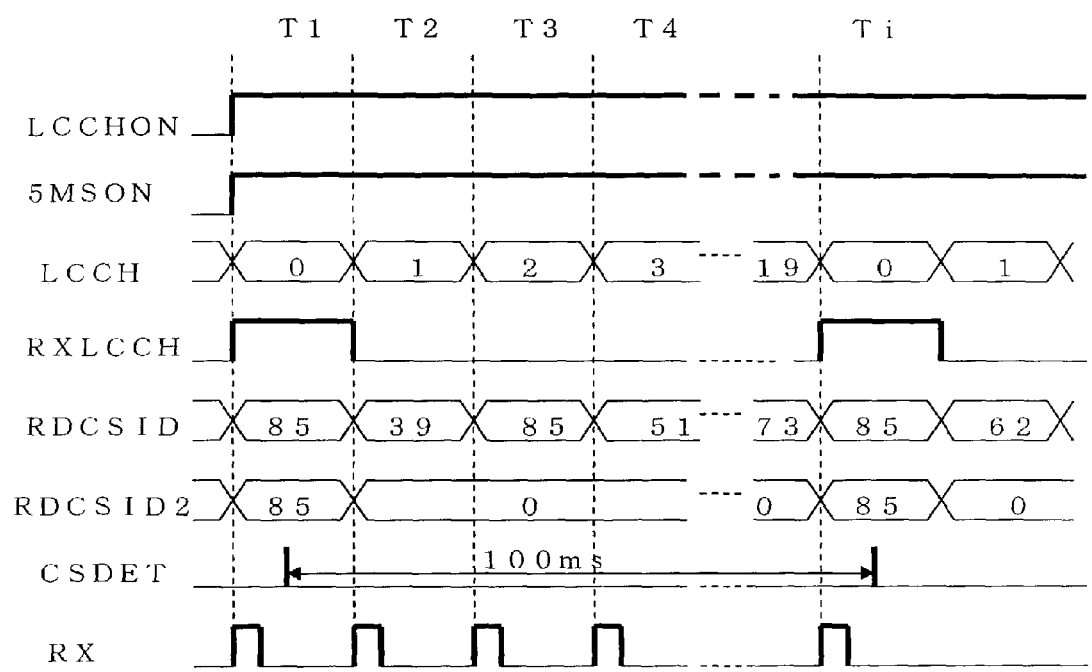
FIG. 8 is an operational diagram of the receiving circuit according to the fourth preferred embodiment of the present invention.

A timing control circuit and a method of timing control according to a fourth preferred embodiment of the present invention will be described with reference to FIGS. 7-8. FIG. 7 is a block diagram showing the receiving circuit according to the fourth preferred embodiment of the present invention. FIG. 8 is an operational diagram for explaining a method carried out by receiving circuit according to the fourth preferred embodiment of the present invention. Like elements are given like or corresponding reference numerals in the above preferred embodiments. Thus, dual explanations of the same elements are avoided.

First, the composition of the receiving circuit according to the fourth preferred embodiment of the present invention will be explained with reference to FIG. 7. The receiving circuit has a demodulation circuit 100 and a timing control circuit 700.

The timing control circuit 700 according to the fourth preferred embodiment of the present invention has a receiving data register (a data storing portion) 111, a synchronous pattern detecting portion (a synchronous detecting portion) 112, a first counter portion 113, a second counter portion 114, a controlling portion (a first controlling portion) 115 and a control information controlling portion (a second controlling portion) 710.

The receiving data register 111 is connected with the demodulation circuit 100 and is input with the demodulated data RD. The receiving data register 111 stores the demodulated data RD temporally and outputs control information RDCSID.

The control information controlling portion 710 has the AND circuits 711, 714, an expectation CSID setting portion 712 and a CSID detecting portion 713. The AND circuit 711 outputs the control information RDCSID as a control information RDCSID2 to the CSID detecting portion 713, when the LCCH cycle receiving timing signal RXLCCH has voltage level of "H" level. The expectation CSID setting portion 712 outputs an expectation CSID 712a which is assigned to the station. The CSID detecting portion 713 compares the expectation CSID 712a and the control information RDCSID2. The CSID detecting portion 713 outputs a detection result CSDET which is a one-shot pulse signal having temporally voltage level of "H" level when the expectation CSID 712a and the control information RDCSID2 are the same each other, and outputs the detection result CSDET having voltage level of "L" level when they are not. The AND circuit 714 carries out the logical AND operation of the control signal LCCHON and the detection result CSDET and outputs a control signal 714a for controlling the circuits in the latter part.

Next, an operation of the timing control circuit according to the fourth preferred embodiment of the present invention will be explained with reference to FIG. 8. Like elements are given like or corresponding reference numerals in the above preferred embodiments. Thus, dual explanations of the same elements and operations are avoided. The timing control circuit according to the fourth preferred embodiment of the present invention receives the communication data at times T2-T4 using the time intervals that the timing control circuit receives the control information at times T1, Ti. So, the control signals LCCHON, 5MSON have voltage level of "H" level.

The operation of the control information controlling portion 710 which is receiving the control information (at times T1, Ti) will first be explained. The AND circuit 711 is input with the LCCH cycle receiving timing signal RXLCCH having voltage level of "H" level. The AND circuit 711 outputs the control information RDCSID as the control information RDCSID2. At this time, both the control information RDCSID2 and the expectation CSID 712a are "85". The CSID detecting portion 713 compares the expectation CSID 712a and the control information RDCSID2 and outputs the detection result CSDET which is a one-shot pulse signal having temporally voltage level of "H" level because they are the same each other. The control signal LCCHON has voltage level of "H" level. Therefore, the AND circuit 714 outputs the control signal 714a which is a one-shot pulse signal having the temporally voltage level of "H" level, every 100 ms.

Next, the operation of the control information controlling portion 710 which is receiving the communication data (for times T2-T4) will be explained. The AND circuit 711 is input with the LCCH cycle receiving timing signal RXLCCH having voltage level of "L" level. The AND circuit 711 does not output the control information RDCSID as the control information RDCSID2, even if the AND circuit 711 is input with the same information as the expectation CSID 712a. When the receiving circuit receives the communication data, the control information controlling portion 710 outputs the control signal 714a having voltage level of "L" level. Therefore, the circuits in the latter part are not controlled by mistake. For instance, in FIG. 8, the control information "85" at time T3 is not input to the CSID detecting portion 713.

The timing control circuit according to the fourth preferred embodiment of the present invention receives the communication data using the time intervals from the receiving control information to the control information to be received next, based on changing voltage levels of the control signal. In addition, the timing control circuit according to the fourth preferred embodiment of the present invention outputs the control signal 714a for controlling the circuits in the latter part only if the receiving circuit receives the control information. Therefore, the timing control circuit according to the fourth preferred embodiment of the present invention prevents the circuits in latter part operating by mistake.

Figure 9:
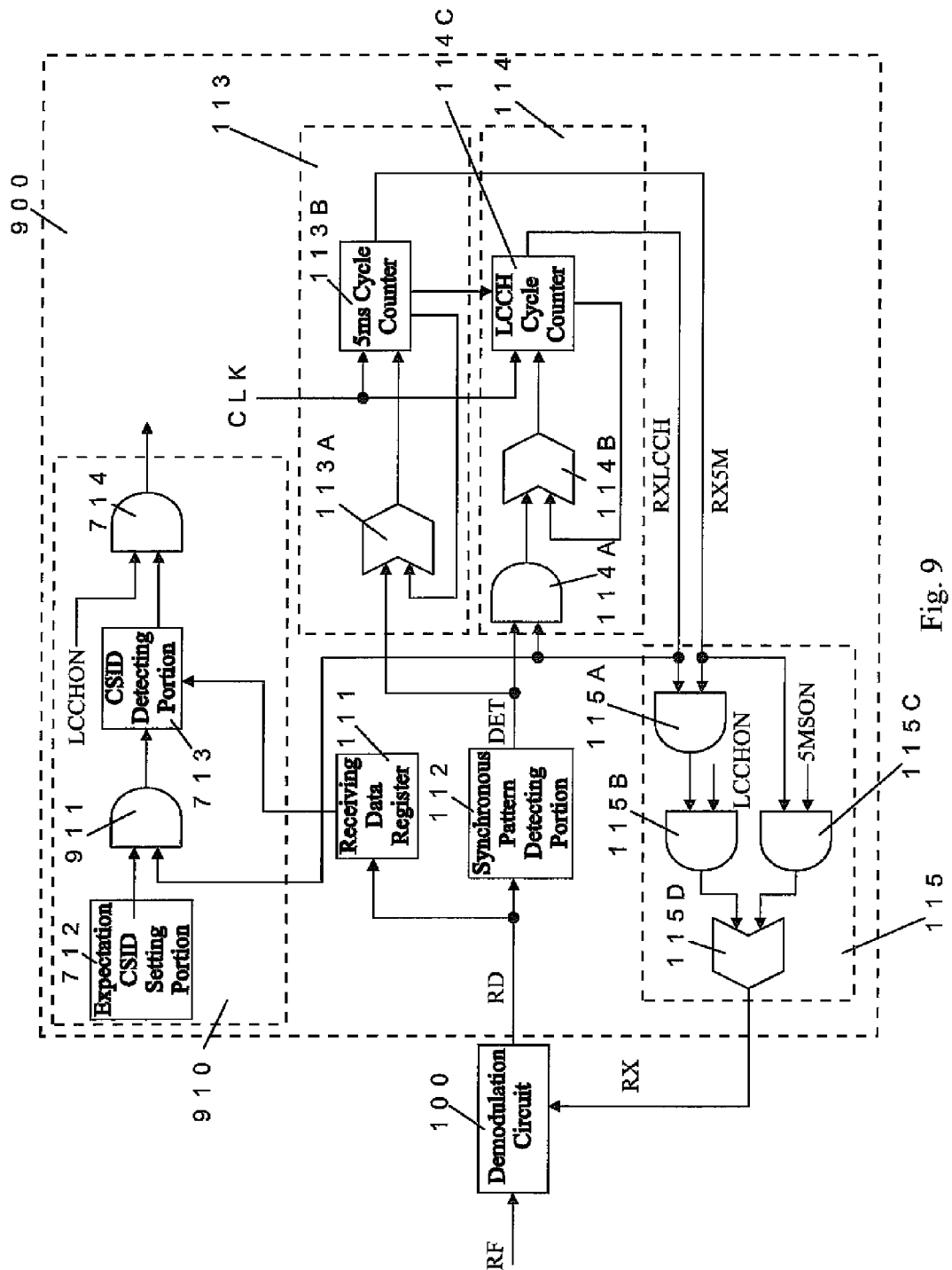
FIG. 9 is a block diagram showing a receiving circuit according to a fifth preferred embodiment of the present invention.

A timing control circuit and a method of timing control according to a fifth preferred embodiment of the present invention will be described with reference to FIG. 9. FIG. 9 is a block diagram showing the receiving circuit according to the fifth preferred embodiment of the present invention. Like elements are given like or corresponding reference numerals in the above preferred embodiments. Thus, dual explanations of the same elements are avoided. The receiving circuit according to the fifth preferred embodiment of the present invention, as shown in FIG. 9, has a demodulation circuit 100 and a timing control circuit 900.

The timing control circuit 900 according to the fourth preferred embodiment of the present invention has a receiving data register (a data storing portion) 111, a synchronous pattern detecting portion (a synchronous detecting portion) 112, a first counter portion 113, a second counter portion 114, a controlling portion (a first controlling portion) 115 and a control information controlling portion (a second controlling portion) 910.

The control information controlling portion 910 has the AND circuits 714, 911, an expectation CSID setting portion 712 and a CSID detecting portion 713. The AND circuit 911 outputs the expectation CSID 911a to the CSID detecting portion 713, when the LCCH cycle receiving timing signal RXLCCH has voltage level of "H" level.

The timing control circuit according to the fifth preferred embodiment of the present invention, just like the timing control circuit according to the fourth preferred embodiment, outputs the control signal 714a for controlling the circuits in the latter part only if the receiving circuit receives the control information. Therefore, the timing control circuit according to the fifth preferred embodiment of the present invention prevents the circuits in latter part operating by mistake.

Figure 10:
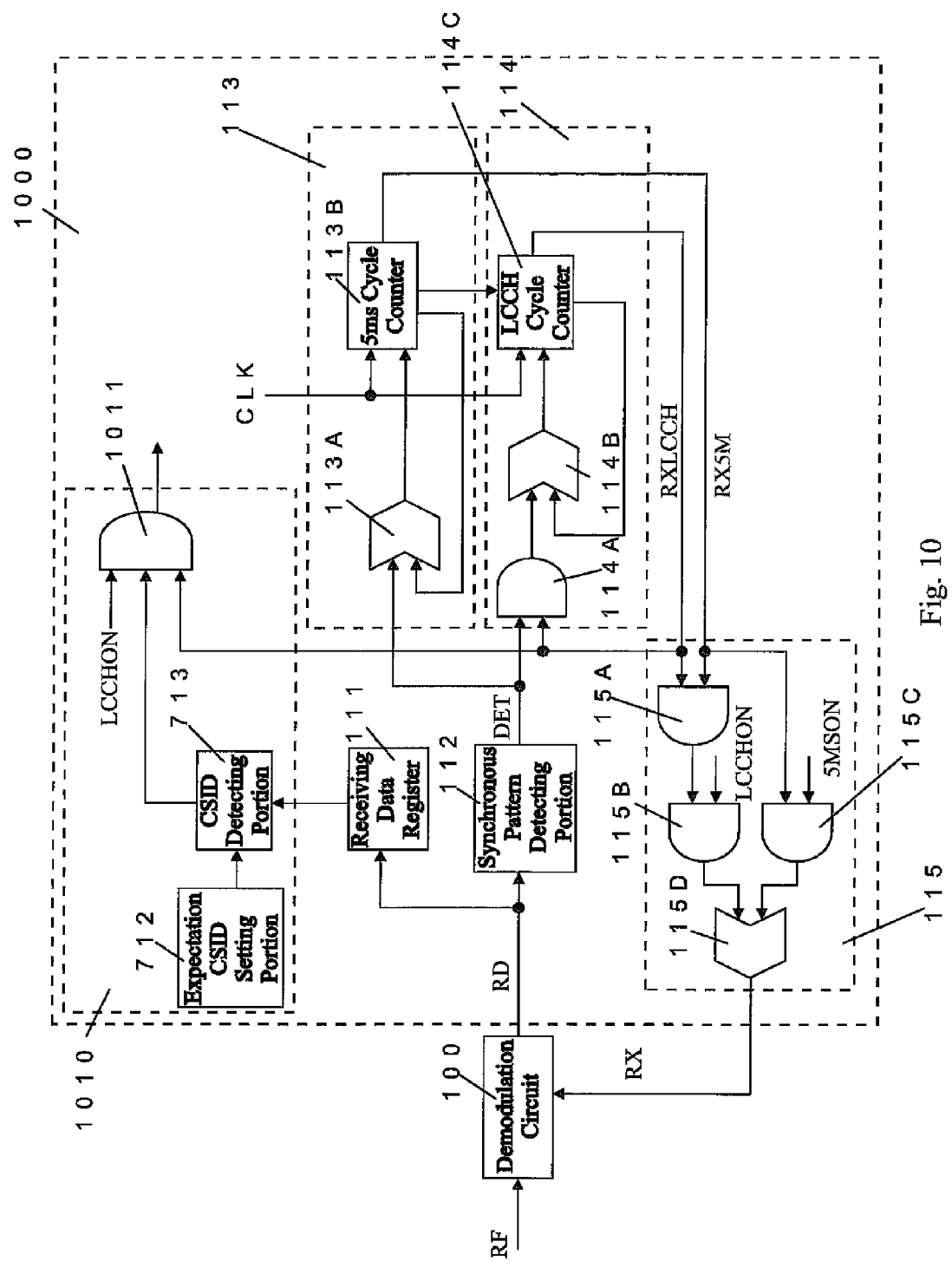
FIG. 10 is a block diagram showing a receiving circuit according to a sixth preferred embodiment of the present invention.

A timing control circuit and a method of timing control according to a sixth preferred embodiment of the present invention will be described with reference to FIG. 10. FIG. 10 is a block diagram showing the receiving circuit according to the sixth preferred embodiment of the present invention. Like elements are given like or corresponding reference numerals in the above preferred embodiments. Thus, dual explanations of the same elements are avoided. The receiving circuit according to the sixth preferred embodiment of the present invention, as shown in FIG. 10, has a demodulation circuit 100 and a timing control circuit 1000.

The timing control circuit 1000 according to the sixth preferred embodiment of the present invention has a receiving data register (a data storing portion) 111, a synchronous pattern detecting portion (a synchronous detecting portion) 112, a first counter portion 113, a second counter portion 114, a controlling portion (a first controlling portion) 115 and a control information controlling portion (a second controlling portion) 1010.

The control information controlling portion 1010 has an AND circuit 1011, an expectation CSID setting portion 712 and a CSID detecting portion 713. The AND circuit 1011 has three input terminals and one output terminal. The AND circuit 1011 outputs the detection result CSDET to the circuits in the latter part, when both the LCCH cycle receiving timing signal RXLCCH and the control signal LCCHON have voltage level of "H" level.

The timing control circuit according to the sixth preferred embodiment of the present invention, just like the timing control circuit according to the fourth preferred embodiment, outputs the control signal 714a for controlling the circuits in the latter part only if the receiving circuit receives the control information. Therefore, the timing control circuit according to the sixth preferred embodiment of the present invention prevents the circuits in latter part operating by mistake.

Figure 11:
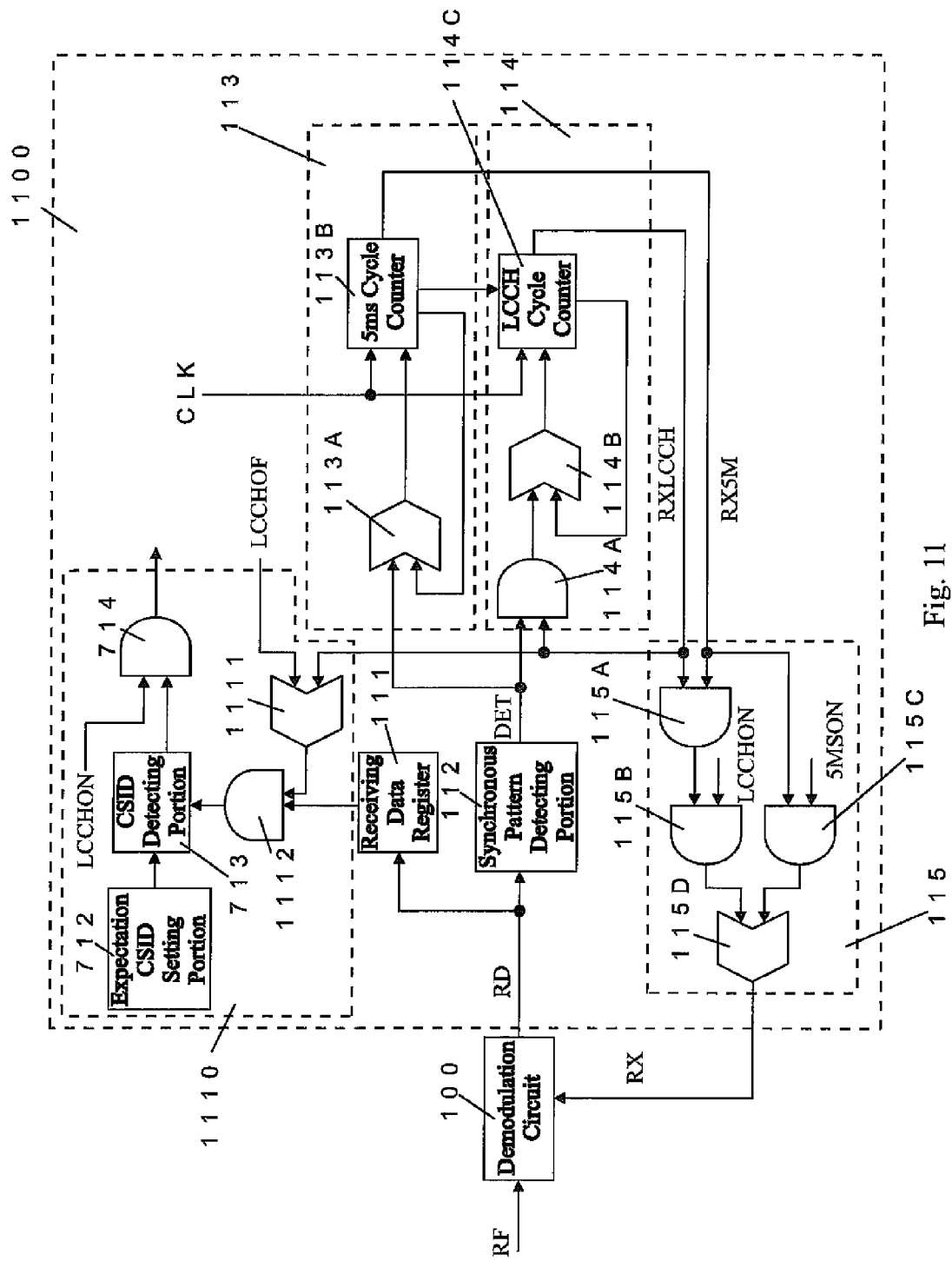
FIG. 11 is a block diagram showing a receiving circuit according to a seventh preferred embodiment of the present invention.
Figure 12:
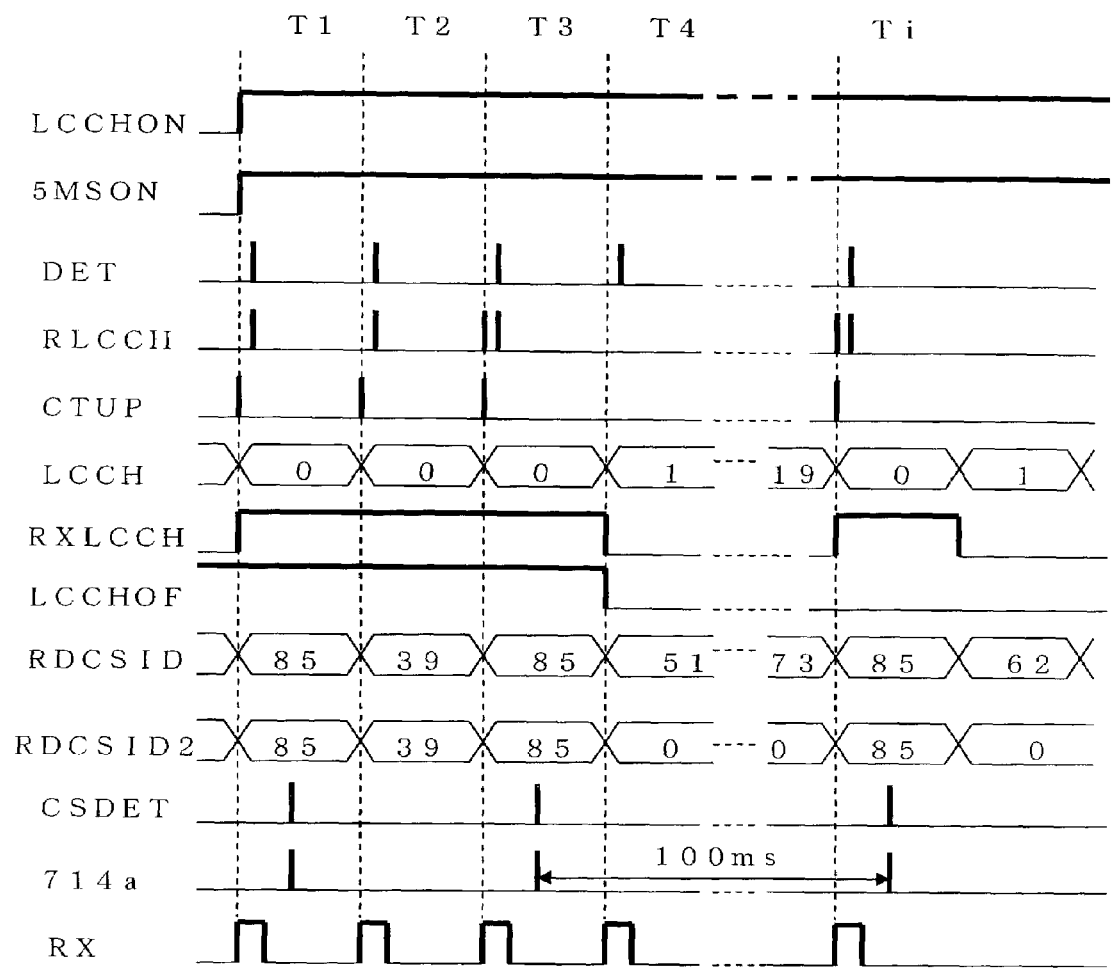
FIG. 12 is an operational diagram of the receiving circuit according to a seventh preferred embodiment of the present invention.

A timing control circuit and a method of timing control according to a seventh preferred embodiment of the present invention will be described with reference to FIGS. 11-12. FIG. 11 is a block diagram showing the receiving circuit according to the seventh preferred embodiment of the present invention. FIG. 12 is an operational diagram for explaining a method carried out by the receiving circuit according to the seventh preferred embodiment of the present invention. Like elements are given like or corresponding reference numerals in the above preferred embodiments. Thus, dual explanations of the same elements are avoided.

First, the composition of the receiving circuit according to the seventh preferred embodiment of the present invention will be explained with reference to FIG. 11. The receiving circuit, as shown in FIG. 11, has a demodulation circuit 100 and a timing control circuit 1100.

The timing control circuit 1100 according to the seventh preferred embodiment of the present invention has a receiving data register (a data storing portion) 111, a synchronous pattern detecting portion (a synchronous detecting portion) 112, a first counter portion 113, a second counter portion 114, a controlling portion (a first controlling portion) 115 and a control information controlling portion (a second controlling portion) 1110.

The control information controlling portion 1110 has an OR circuit 1111, the AND circuits 714, 1112, an expectation CSID setting portion 712 and a CSID detecting portion 713. The OR circuit 1111 is input with a control signal LCCHOF and an LCCH cycle receiving timing signal RXLCCH. The OR circuit 1111 carries out the logical OR operation of the control signal LCCHOF and the LCCH cycle receiving timing signal RXLCCH and outputs a logical OR operation result 1111a having voltage level of "H" level when at least either signal has voltage level of "H" level. The control signal LCCHOF has voltage level of "H" level until the timing control circuit receives the control information correctly. The AND circuit 1112 outputs the control information RDCSID as a control information RDCSID2 to the CSID detecting portion 713, when the logical OR operation result 1111a has voltage level of "H" level.

Next, an operation of the timing control circuit according to the seventh preferred embodiment of the present invention will be explained with reference to FIG. 12. Like elements are given like or corresponding reference numerals in the above preferred embodiments. Thus, dual explanations of the same elements and operations are avoided. The timing control circuit does not receive the control information correctly at times T1, T2, and receives the control information after time T3. The control signal LCCHOF has voltage level of "H" level for times T1-T3 and has voltage level of "L" level after time T4. The control signals LCCHON, 5MSON have voltage level of "H" level in order to receive the communication data using the time intervals that timing control circuit receives the control information every predetermined time.

At times T1-T3 and Ti, the LCCH cycle counter 114C is input with a logical OR operation result RLCCH which is a one-shot pulse signal having voltage level of "H" level. The LCCH cycle counter 114C resets the counting value to a certain value, "0", and outputs an LCCH cycle receiving timing signal RXLCCH having voltage level of "H" level. At times T1-T3, the OR circuit 1111 is input with the control signal LCCHOF having voltage level of "H" level. The OR circuit 1111 outputs the logical OR operation result 1111a having voltage level of "H" level. By the way, at time Ti, the control signal LCCHOF has voltage level of "L" level, however, the LCCH cycle receiving timing signal RXLCCH has voltage level of "H" level. So, the OR circuit 1111 outputs the logical OR operation result 1111a having voltage level of "H" level. At times T1-T3 and Ti, the AND circuit 1112 outputs the control information RDCSID as the control information RDCSID2, because the logical OR operation result 1111a has voltage level of "H" level. At times T1-T3 and Ti, the CSID detecting portion 713 is input with the control information RDCSID2. The CSID detecting portion 713 compares the control information RDCSID2 and the expectation CSID 712a (in this case, "85"). At times T1, T3 and Ti, they are the same each other. So, the CSID detecting portion 713 outputs the detection result CSDET which is a one-shot pulse signal having voltage level of "H" level. The detection result CSDET at time T1 is not a correct result indicating correct LCCH cycle, because the detection result CSDET is detected within 100 ms from at time T1.

The timing control circuit according to the seventh preferred embodiment of the present invention, just like the timing control circuit according to the fourth preferred embodiment, outputs the control signal 714a for controlling the circuits in the latter part only if the receiving circuit receives the control information. Therefore, the timing control circuit according to the fifth preferred embodiment of the present invention prevents the circuits in latter part operating by mistake. In addition, the timing control circuit according to the seventh preferred embodiment of the present invention detects the detection result CSDET correctly, even if the timing control circuit does not receive the control information correctly.

Figure 13:
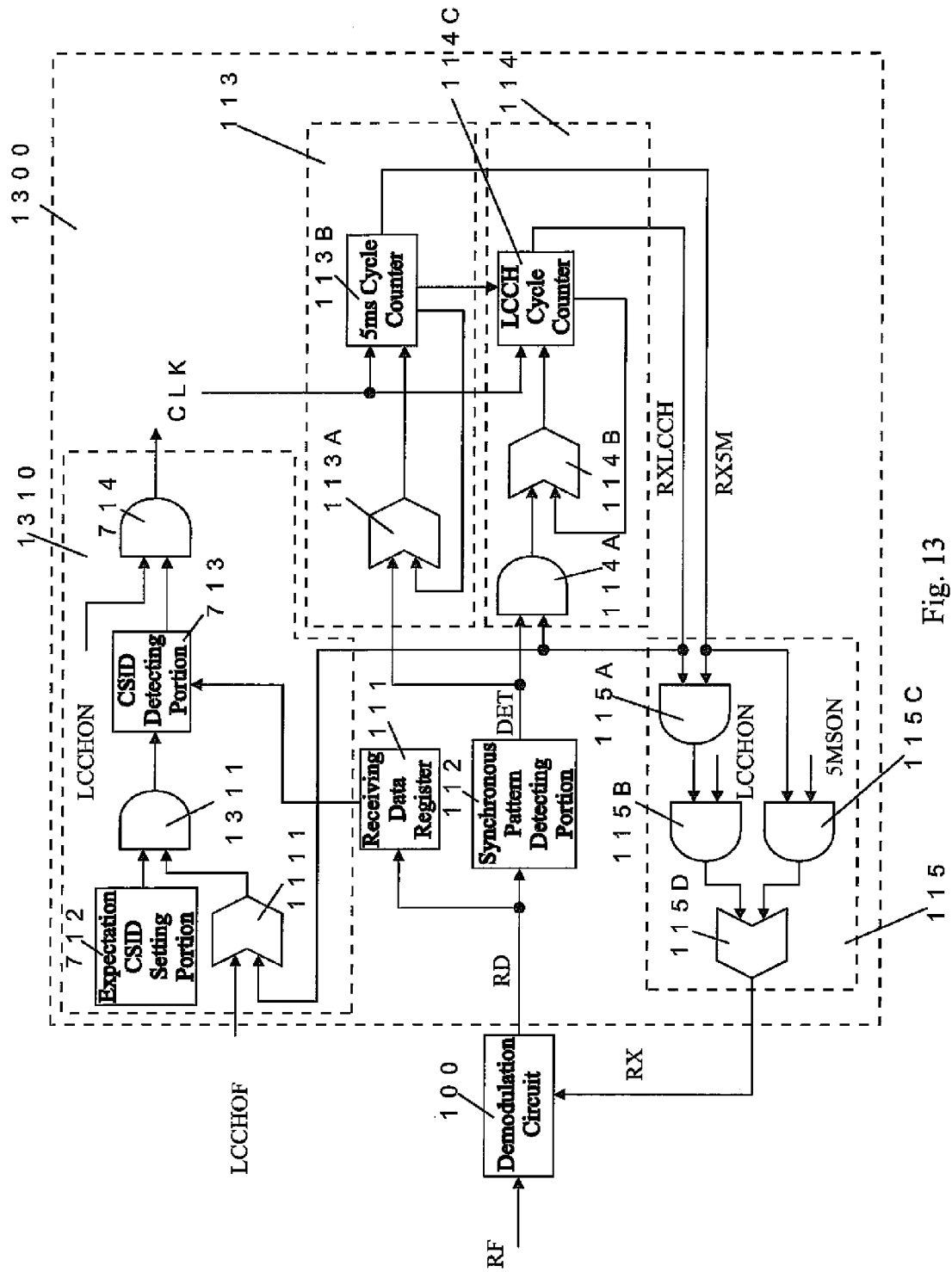
FIG. 13 is a block diagram showing a receiving circuit according to an eighth preferred embodiment of the present invention.

A timing control circuit and a method of the timing control according to a eighth preferred embodiment of the present invention will be described with reference to FIG. 13. FIG. 13 is a block diagram showing the receiving circuit according to the eighth preferred embodiment of the present invention. Like elements are given like or corresponding reference numerals in the above preferred embodiments. Thus, dual explanations of the same elements are avoided. The receiving circuit according to the eighth preferred embodiment of the present invention, as shown in FIG. 13, has a demodulation circuit 100 and a timing control circuit 1300.

The timing control circuit 1300 according to the eighth preferred embodiment of the present invention has a receiving data register (a data storing portion) 111, a synchronous pattern detecting portion (a synchronous detecting portion) 112, a first counter portion 113, a second counter portion 114, a controlling portion (a first controlling portion) 115 and a control information controlling portion (a second controlling portion) 1310.

The control information controlling portion 1310 has an OR circuit 1111, the AND circuits 714, 1311, an expectation CSID setting portion 712 and a CSID detecting portion 713. The AND circuit 1311 has three input terminals and one output terminal. The AND circuit 1011 outputs the expectation CSID to the CSID detection portion 713, when the logical AND operation result 1111a has voltage level of "H" level.

The timing control circuit according to the eighth preferred embodiment of the present invention, just like the timing control circuit according to the seventh preferred embodiment detects the detection result CSDET correctly, even if the timing control circuit does not receive the control information correctly.

Figure 14:
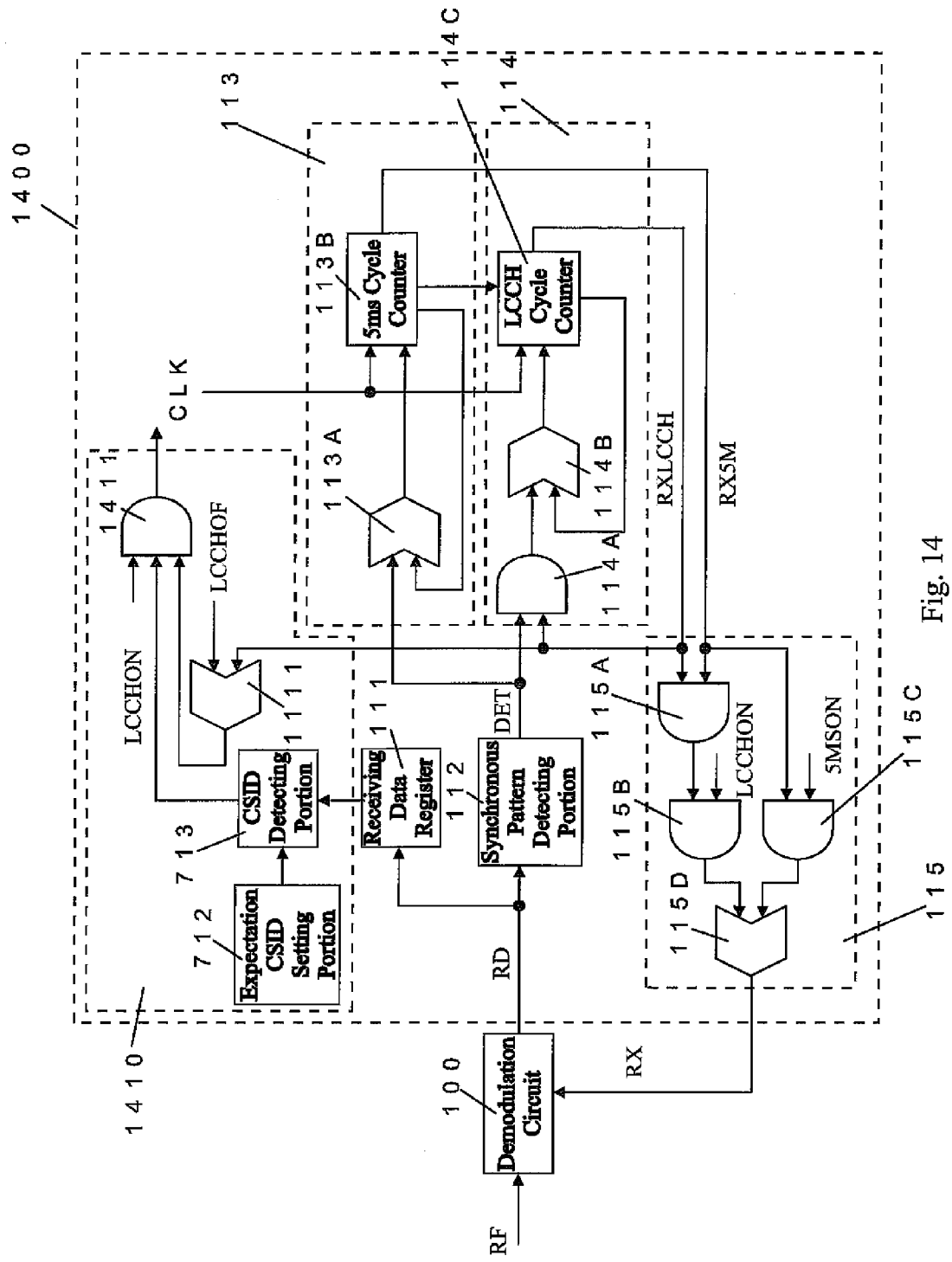
FIG. 14 is a block diagram showing a receiving circuit according to a ninth preferred embodiment of the present invention.

A timing control circuit and a method of the timing control according to a ninth preferred embodiment of the present invention will be described with reference to FIG. 14. FIG. 14 is a block diagram showing the receiving circuit according to the ninth preferred embodiment of the present invention. Like elements are given like or corresponding reference numerals in the above preferred embodiments. Thus, dual explanations of the same elements are avoided. The receiving circuit according to the ninth preferred embodiment of the present invention, as shown in FIG. 14, has a demodulation circuit 100 and a timing control circuit 1400.

The timing control circuit 1400 according to the ninth preferred embodiment of the present invention has a receiving data register (a data storing portion) 111, a synchronous pattern detecting portion (a synchronous detecting portion) 112, a first counter portion 113, a second counter portion 114, a controlling portion (a first controlling portion) 115 and a control information controlling portion (a second controlling portion) 1410.

The control information controlling portion 1410 has an AND circuit 1411, an expectation CSID setting portion 712 and a CSID detecting portion 713. The AND circuit 1411 has three input terminals and one output terminal. The AND circuit 1411 outputs the detection result CSDET output by the CSID detection portion 713 to the circuits in the latter part, when both the logical AND operation result 1111a and the control signal LCCHON have voltage level of "H" level.

The timing control circuit according to the ninth preferred embodiment of the present invention, just like the timing control circuit according to the seventh preferred embodiment, outputs the detection result CSDET for controlling the circuits in the latter part only if the receiving circuit receives the control information. Therefore, the timing control circuit according to the ninth preferred embodiment of the present invention prevents the circuits in latter part operating by mistake.

While the preferred form of the present invention has been described, it is to be understood that modifications will be apparent to those skilled in the art without departing from the spirit of the invention. For example, the LCCH cycle receiving timing signal RXLCCH is input with the AND circuit 114A in the above embodiments. However, the logical AND operation result 115a may be input it.

The scope of the invention, therefore, is to be determined solely by the following claims.

What is claimed is:

1. A timing control circuit, comprising:
   a synchronous pattern detecting portion that detects a synchronous pattern data of a received signal that has been demodulated based on a control signal, and that generates a detection result;
   a first counter portion that generates a first signal at each first cycle based on the detection result;
   a second counter portion that generates a second signal at each second cycle based on the detection result; and
   a control portion that generates the control signal based on the first and second signals, wherein said control portion includes
      a first logic operation circuit that carries out a logic operation of said first and second signals, and that outputs a first logic operation result,
      a second logic operation circuit that carries out a logic operation of said first logic operation result and a first external signal, and that outputs a second logic operation result,
      a third logic operation circuit that carries out a logic operation of said first signal and a second external signal, and that outputs a third logic operation result, and
      a fourth logic operation circuit that carries out a logic operation of said second and third logic operation results, and that outputs said control signal.

2. The timing control circuit according to claim 1, wherein said detection result comprises a first detection result and a second detection result, and wherein said first counter portion generates said first signal based on the first detection result, and wherein said second portion generates said second signal based on the second detection result.

3. The timing control circuit according to claim 1, wherein said control portion is a first control portion, and wherein said control signal is a first control signal, and wherein said timing control circuit further comprises:
   a second control portion that generates a second control signal for controlling a later circuit stage based on the second signal.

4. A timing control circuit, comprising:
   a synchronous pattern detecting portion that detects a synchronous pattern data of a received signal that has been demodulated based on a control signal, and that generates a detection result;

a first counter portion that generates a first signal at each first cycle based on the detection result;

a second counter portion that generates a second signal at each second cycle based on the detection result; and a control portion that generates the control signal based on the first and second signals, wherein said second counter portion generates said second signal at each second cycle based on said detection result and a first external signal, and wherein said control portion includes a first logic operation circuit that carries out a logic operation of said first and second signals, and that outputs a first logic operation result, a second logic operation circuit that carries out a logic operation of said first signal and a second external signal, and that outputs a second logic operation result, and a third logic operation circuit that carries out a logic operation of said first and second logic operation results, and that outputs said control signal.

5. The timing control circuit according to claim 4, wherein said detection result comprises a first detection result and a second detection result, and wherein said first counter portion generates said first signal based on the first detection result, and wherein said second portion generates said second signal based on the second detection result.

* * * * *